United States Patent
Umebayashi

(10) Patent No.: US 11,458,754 B2
(45) Date of Patent: Oct. 4, 2022

(54) INK SET

(71) Applicant: FUJIFILM CORPORATION, Tokyo (JP)

(72) Inventor: Tsutomu Umebayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 114 days.

(21) Appl. No.: 16/858,766

(22) Filed: Apr. 27, 2020

(65) Prior Publication Data
US 2020/0254799 A1 Aug. 13, 2020

Related U.S. Application Data

(63) Continuation of application No. PCT/JP2018/038894, filed on Oct. 18, 2018.

(30) Foreign Application Priority Data

Nov. 2, 2017 (JP) ............................ JP2017-213192

(51) Int. Cl.
*B41M 5/00* (2006.01)
*B41M 5/50* (2006.01)
*C09D 11/101* (2014.01)
*C09D 11/107* (2014.01)
*C09D 11/40* (2014.01)

(52) U.S. Cl.
CPC ............ *B41M 5/0023* (2013.01); *B41M 5/50* (2013.01); *C09D 11/101* (2013.01); *C09D 11/107* (2013.01); *C09D 11/40* (2013.01)

(58) Field of Classification Search
CPC ..... B41M 5/0023; B41M 5/50; C09D 11/101; C09D 11/107; C09D 11/40; C09D 11/36; C09D 11/106; B41J 2/01
See application file for complete search history.

(56) References Cited

U.S. PATENT DOCUMENTS

| 5,573,833 A | * | 11/1996 | Imamura | ............ B41M 5/38214 428/211.1 |
| 2014/0248473 A1 | * | 9/2014 | Makuta | .................. C09D 11/40 428/195.1 |
| 2018/0282559 A1 | | 10/2018 | Umebayashi | |

FOREIGN PATENT DOCUMENTS

| JP | S62-205174 A | 9/1987 |
| JP | 2000-326451 A | 11/2000 |
| JP | 2008-087246 A | 4/2008 |
| JP | 2012-210764 A | 11/2012 |
| JP | 2017-078133 A | 4/2017 |
| JP | 2017-109485 A | 6/2017 |
| WO | 2017/104845 A1 | 6/2017 |

OTHER PUBLICATIONS

International Search Report issued in International Application No. PCT/JP2018/038894 dated Jan. 15, 2019.
Written Opinion of the ISA issued in International Application No. PCT/JP2018/038894 dated Jan. 15, 2019.
English language translation of the following: Office action dated Apr. 20, 2021 from the JPO in a Japanese patent application No. 2019-551087 corresponding to the instant patent application.

* cited by examiner

*Primary Examiner* — Jessica M Roswell
(74) *Attorney, Agent, or Firm* — Solaris Intellectual Property Group, PLLC

(57) ABSTRACT

An ink set includes an ink-jet color ink that contains a colorant, an organic solvent, a polymerizable compound, and a photopolymerization initiator and a clear ink which contains an organic solvent and a vinyl chloride-vinyl acetate copolymer and in which Mt2/Mt1 is 0.40 or more where Mt1 represents a total mass content of a nonvolatile component, and Mt2 represents a mass content of the vinyl chloride-vinyl acetate copolymer.

17 Claims, 1 Drawing Sheet

INK SET

CROSS-REFERENCE TO RELATED APPLICATION

This application is a Continuation of International Application No. PCT/JP2018/038894, filed Oct. 18, 2018, which claims priority to Japanese Patent Application No. 2017-213192 filed Nov. 2, 2017. Each of the above applications is hereby expressly incorporated by reference, in its entirety, into the present application.

BACKGROUND OF THE INVENTION

1. Field of the Invention

The present disclosure relates to an ink set.

2. Description of the Related Art

Regarding an ink jet recording method, various studies have been hitherto conducted.

For example, as an ink jet recording method for providing an image having good metallic appearance (luster) and good rubfastness, JP2012-210764A discloses an ink jet recording method including an image forming step of forming an image by ejecting an effect pigment ink on a recording medium; a transparent ink application step of applying a transparent ink on the recording medium; and a curing step of curing the effect pigment ink and the transparent ink on the recording medium in this order. The method does not include a step of curing the effect pigment ink between the image forming step and the transparent ink application step, or when the method includes this step, a curing ratio of the effect pigment ink is 85% or less. The transparent ink contains a polymerization initiator and a polymerizable compound and contains substantially no pigment, and the effect pigment ink contains an effect pigment, a polymerization initiator, and a polymerizable compound.

As an ink jet recording method capable of forming an image which is obtained by overprinting a plurality of inks and in which bleeding and cracking are suppressed, JP2017-109485A discloses an ink jet recording method including a step of forming a first ink layer by ejecting, on a recording medium, a first ink composition that includes water, a water-soluble organic solvent, and a solid component including at least a coloring material by an ink jet method; a first drying step of evaporating 80% by mass or more of water included in the first ink composition in the first ink layer; a step of forming a second ink layer by ejecting, on the first ink layer that is subjected to the first drying step, a second ink composition that includes water, a water-soluble organic solvent, and a solid component including at least a coloring material by the ink jet method; and a second drying step of evaporating a volatile component on the recording medium after the step of forming the second ink layer. In the method, a value of "r2/r1" is 2 or less, where "r1" represents "water-soluble organic solvent content/solid component content" of the first ink composition, and "r2" represents "water-soluble organic solvent content/solid component content" of the second ink composition.

In addition, JP2017-078133A discloses a composition set capable of providing recorded matter that has high abrasion resistance and that is good in terms of odor reduction and image quality, and an ink jet recording method using the composition set.

JP2017-078133A discloses, as the above composition set, a composition set including a radiation curable ink jet coloring composition that includes a coloring material and a monomer A having a specific structure and serving as a polymerizable compound; and a radiation curable ink-jet clear composition that includes, as a polymerizable compound, a (meth)acrylic ester B which is a monofunctional polymerizable compound having an ether structure of at least any of heterocyclic groups and saturated aliphatic ether groups.

SUMMARY OF THE INVENTION

Incidentally, in some cases, a color image is formed on a recording medium such as a resin substrate by an ink jet method for the purpose of decoration or the like. In such a case, a lamination substrate may be further thermally fused onto the color image for the purpose of, for example, protecting the color image formed as described above. A thermal fusion product obtained by thermal fusion and having a layered structure of lamination substrate/color image/recording medium is used as, for example, a flooring or a wall material of transport equipment (such as a train or a bus) or a flooring or a wall material of buildings.

However, in the thermal fusion product, there may be a problem of separation between the recording medium and the lamination substrate (for example, interfacial peeling between the lamination substrate and the color image, cohesive failure of the color image, and interfacial peeling between the color image and the recording medium).

An object of the present disclosure is to provide an ink set capable of producing a laminate that includes, on a recording medium, a color image which is ink jet recorded matter, and a clear ink layer disposed on at least the color image, in which, in the case where a lamination substrate is thermally fused to the clear ink layer, the laminate exhibits good peel strength between the recording medium and the lamination substrate.

Specific means for achieving the object includes the following embodiments.

<1> An ink set including an ink-jet color ink that contains a colorant, an organic solvent, a polymerizable compound, and a photopolymerization initiator; and a clear ink that contains an organic solvent and a vinyl chloride-vinyl acetate copolymer, and in which Mt2/Mt1 is 0.40 or more, wherein Mt1 represents a total mass content of a nonvolatile component, and Mt2 represents a mass content of the vinyl chloride-vinyl acetate copolymer.

<2> The ink set according to <1>, in which a content of the vinyl chloride-vinyl acetate copolymer contained in the clear ink is from 1.0% by mass to 6.0% by mass relative to a total amount of the clear ink.

<3> The ink set according to <1> or <2>, in which a content of the organic solvent contained in the clear ink is 90% by mass or more relative to a total amount of the clear ink.

<4> The ink set according to any one of <1> to <3>, in which the polymerizable compound contained in the ink-jet color ink includes a bifunctional urethane (meth)acrylate having a weight-average molecular weight of from 2,000 to 15,000.

<5> The ink set according to any one of <1> to <4>, in which the ink-jet color ink further contains a vinyl chloride-vinyl acetate copolymer.

<6> The ink set according to <5>, in which a total content of the polymerizable compound and the vinyl chloride-vinyl acetate copolymer that are contained in the ink-jet color ink is 10% by mass to 20% by mass relative to a total amount of the ink-jet color ink.

<7> The ink set according to <5> or <6>, in which a content of the vinyl chloride-vinyl acetate copolymer contained in the ink-jet color ink is from 0.5% by mass to 2.0% by mass relative to a total amount of the ink-jet color ink.

<8> The ink set according to any one of <5> to <7>, wherein Mt1, Mt2, Mc1, and Mc2 satisfy the following formula (1):

$$Mc2/Mc1 \leq Mt2/Mt1 \qquad \text{Formula (1)}$$

wherein Mt1 represents the total mass content of the nonvolatile component contained in the clear ink, Mt2 represents the mass content of the vinyl chloride-vinyl acetate copolymer contained in the clear ink, Mc1 represents a total mass content of a nonvolatile component contained in the ink-jet color ink, and Mc2 represents a mass content of the vinyl chloride-vinyl acetate copolymer contained in the ink-jet color ink.

<9> The ink set according to any one of <1> to <8>, in which a content of a polymerizable compound in the clear ink is 3% by mass or less relative to a total amount of the clear ink.

<10> The ink set according to any one of <1> to <9>, in which in a thermal fusion product that includes, on a recording medium, a color image which is ink jet recorded matter, a clear ink layer disposed on at least the color image, and a lamination substrate that is thermally fused to the clear ink layer, the ink set is used for forming the color image and the clear ink layer.

According to the present disclosure, there is provided an ink set capable of producing a laminate that includes, on a recording medium, a color image which is ink jet recorded matter, and a clear ink layer disposed on at least the color image, in which, in the case where a lamination substrate is thermally fused to the clear ink layer, the laminate exhibits good peel strength between the recording medium and the lamination substrate.

DESCRIPTION OF THE PREFERRED EMBODIMENTS

Figure 1:
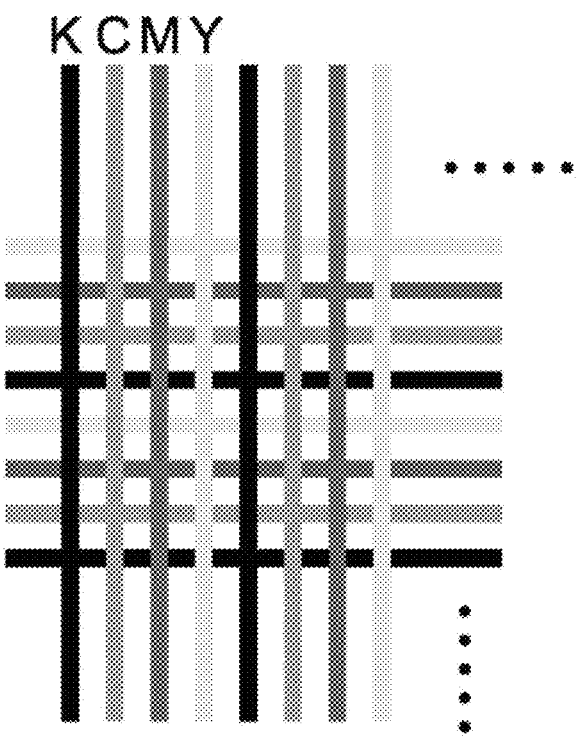
FIG. 1 is a view that conceptually illustrates a grid-like image used in an evaluation of Examples.

In the present specification, a range of numerical values expressed with "to" means a range that includes a numerical value before "to" as a lower limit value and a numerical value after "to" as an upper limit value.

In the present specification, when a plurality of substances corresponding to each component are present in a composition, an amount of each component in the composition means a total amount of the plurality of substances that are present in the composition unless otherwise stated.

In a range of numerical values described stepwise in the present specification, an upper limit value or a lower limit value described in a certain range of numerical values may be replaced by an upper limit value or a lower limit value of another range of numerical values described stepwise or may be replaced by a value disclosed in Examples.

In the present specification, the term "step" refers to not only an independent step but also a step that is not clearly distinguished from another step as long as a desired purpose of the step is achieved.

In the present specification, "(meth)acrylic" covers a concept that includes both acrylic and methacrylic, "(meth)acrylate" covers a concept that includes both acrylate and methacrylate, and "(meth)acryloyl" covers a concept that includes both acryloyl and methacryloyl.

In the present specification, "(poly)alkylene glycol" covers a concept that includes both alkylene glycol and polyalkylene glycol, "(poly)ethylene glycol" covers a concept that includes both ethylene glycol and polyethylene glycol, and "(poly)propylene glycol" covers a concept that includes both propylene glycol and polypropylene glycol.

In the present specification, combinations of preferred embodiments are more preferred embodiments.

An ink set according to the present disclosure includes an ink-jet color ink that contains a colorant, an organic solvent, a polymerizable compound, and a photopolymerization initiator, and a clear ink which contains an organic solvent and a vinyl chloride-vinyl acetate copolymer and in which Mt2/Mt1 is 0.40 or more where Mt1 represents a total mass content of a nonvolatile component, and Mt2 represents a mass content of the vinyl chloride-vinyl acetate copolymer.

According to the ink set according to the present disclosure, it is possible to produce a laminate that includes, on a recording medium, a color image which is ink jet recorded matter, and a clear ink layer disposed on at least the color image (that is, a laminate having a layered structure of clear ink layer/color image/recording medium).

In the case where a lamination substrate is further thermally fused to the clear ink layer of this laminate (that is, in the case where a thermal fusion product having a layered structure of lamination substrate/clear ink layer/color image/recording medium is formed), the above-produced laminate having the layered structure of clear ink layer/color image/recording medium exhibits good peel strength between the recording medium and the lamination substrate. Specifically, in the case where the thermal fusion product is formed, separation between the recording medium and the lamination substrate is suppressed.

The reason why the above effect is achieved is presumably as follows. However, the ink set according to the present disclosure is not limited by the presumed reason described below.

The color image in the laminate and the thermal fusion product is formed by applying the ink-jet color ink in the ink set to a recording medium by an ink jet method, and subjecting the applied ink-jet color ink to drying and irradiation with active radiation. The irradiation with active radiation causes polymerization of a polymerizable compound in the ink-jet color ink to form a color image having good hardness and good adhesiveness to the recording medium. Therefore, in the thermal fusion product that is finally obtained, cohesive failure of the color image and interfacial peeling between the color image and the recording medium are suppressed.

The clear ink layer in the laminate and the thermal fusion product is formed by applying the clear ink in the ink set to at least the color image on the recording medium and drying the clear ink. The clear ink layer formed as described above contains a vinyl chloride-vinyl acetate copolymer. A thermal melting point of the vinyl chloride-vinyl acetate copolymer is close to a thermal melting point of a resin (for example, a polyurethane resin or a vinyl chloride resin) that is generally contained in the recording medium in the thermal fusion product. Therefore, interfacial peeling between the clear ink layer and the lamination substrate, cohesive failure of the clear ink layer, and interfacial peeling between the clear ink layer and the color image are considered to be suppressed in the thermal fusion product. It is considered that these functions due to the vinyl chloride-vinyl acetate copolymer are effectively achieved when the ratio (Mt2/Mt1) of the mass content (Mt2) of the vinyl chloride-vinyl acetate copolymer to the total mass content (Mt1) of the nonvolatile component in the clear ink is 0.40 or more.

For the reasons described above, it is considered that the use of the ink set according to the present disclosure enables production of a laminate having a layered structure of clear ink layer/color image/recording medium, wherein, in the case where a lamination substrate is thermally fused to the clear ink layer, the laminate exhibits good peel strength between the recording medium and the lamination substrate.

In the present specification, "clear ink" refers to an ink that contains substantially no colorant.

Herein, "contains substantially no colorant" means that a content of a colorant in the ink is less than 0.5% by mass (more preferably less than 0.1% by mass, particularly preferably 0% by mass).

The clear ink is not necessarily limited to an ink-jet ink. However, the clear ink is preferably an ink-jet ink (that is, ink-jet clear ink) from the viewpoint that a production apparatus for producing a laminate having a layered structure of clear ink layer/color image/recording medium can be simplified.

As described above, the ink set according to the present disclosure includes an ink-jet color ink and a clear ink.

The ink set according to the present disclosure may include only one ink-jet color ink or two or more ink-jet color inks.

The ink set according to the present disclosure may have only one clear ink or two or more clear inks.

One preferred embodiment of the ink set according to the present disclosure is an embodiment of an ink set including two or more ink-jet color inks (hereinafter, also simply referred to as "color inks") and one or more clear inks.

According to this embodiment, a multi-color image can be formed.

Hereafter, examples of the two or more color inks include three color inks constituted by a cyan ink, a magenta ink, and a yellow ink; four color inks constituted by a cyan ink, a magenta ink, a yellow ink, and a black ink; four or more color inks constituted by the above three color inks and at least one selected from the group consisting of a white ink, a green ink, an orange ink, a light cyan ink, a light magenta ink, and a light yellow ink; and five or more color inks constituted by the above four color inks and at least one selected from the group consisting of a white ink, a green ink, an orange ink, a light cyan ink, a light magenta ink, and a light yellow ink.

However, the two or more color inks are not limited to these specific examples.

Hereafter, the clear ink and the color ink included in the ink set according to the present disclosure will be described.

Clear Ink

The ink set according to the present disclosure includes at least one clear ink.

As described above, the clear ink contains an organic solvent and a vinyl chloride-vinyl acetate copolymer, in which Mt2/Mt1 is 0.40 or more where Mt1 represents a total mass content of a nonvolatile component, and Mt2 represents a mass content of the vinyl chloride-vinyl acetate copolymer.

Vinyl Chloride-Vinyl Acetate Copolymer

The clear ink contains at least one vinyl chloride-vinyl acetate copolymer.

In the clear ink, Mt2/Mt1 is 0.40 or more where Mt1 represents a total mass content of a nonvolatile component contained in the clear ink, and Mt2 represents a mass content of the vinyl chloride-vinyl acetate copolymer (a total mass content in the case of two or more vinyl chloride-vinyl acetate copolymers) contained in the clear ink.

When Mt2/Mt1 is 0.40 or more, the effect of improving the peel strength between the lamination substrate and the recording medium is achieved in the case where the thermal fusion product is formed.

From the viewpoint of effectively achieving the effect, Mt2/Mt1 is preferably 0.45 or more, more preferably 0.50 or more.

Herein, the vinyl chloride-vinyl acetate copolymer is included in the nonvolatile component.

Accordingly, Mt2/Mt1 is theoretically 1.00 or less. Mt2/Mt1 may be 0.98 or less.

Herein, "nonvolatile component contained in a clear ink" means a component remaining on glass when a clear ink is applied from an ink jet head to glass having a size of 10 cm×10 cm in an application amount of 15 g/m$^2$ to form a solid image, and the glass on which the solid image is formed is heated for five minutes in a thermostatic chamber at a temperature of 60° C. and a pressure of 1 atm (101,325 Pa) in an air atmosphere.

In the clear ink applied as described above, the total mass content Mt1 of the nonvolatile component contained in the clear ink means a mass of the above residual component, and the mass content Mt2 of the vinyl chloride-vinyl acetate copolymer contained in the clear ink means a mass of the vinyl chloride-vinyl acetate copolymer contained in the residual component.

The total mass content (Mt1) of the nonvolatile component contained in the clear ink corresponds to a total mass of the clear ink except for the organic solvent.

The copolymerization ratio in the vinyl chloride-vinyl acetate copolymer is not particularly limited. Preferably, the amount of vinyl chloride copolymerized is 70% by mass to 95% by mass, and the amount of vinyl acetate copolymerized is 5% by mass to 30% by mass. More preferably, the amount of vinyl chloride copolymerized is 80% by mass to 93% by mass, and the amount of vinyl acetate copolymerized is 7% by mass to 20% by mass. Still more preferably, the amount of vinyl chloride copolymerized is 80% by mass to 90% by mass, and the amount of vinyl acetate copolymerized is 10% by mass to 20% by mass.

The vinyl chloride-vinyl acetate copolymer preferably has a weight-average molecular weight (Mw) of 13,000 to 30,000.

When the weight-average molecular weight (Mw) of the vinyl chloride-vinyl acetate copolymer is 13,000 or more, the peel strength between the lamination substrate and the recording medium in the thermal fusion product further improves.

When the weight-average molecular weight (Mw) of the vinyl chloride-vinyl acetate copolymer is 30,000 or less, the ejection performance of the color ink further improves.

The Mw of the vinyl chloride-vinyl acetate copolymer is preferably 13,000 to 20,000.

In the present specification, the weight-average molecular weight (Mw) means a value measured by gel permeation chromatography (GPC).

The GPC is performed by using HLC-8020GPC (available from Tosoh Corporation), three TSKgel (registered trademark) Super Multipore HZ-H columns (4.6 mm ID×15 cm, available from Tosoh Corporation) as columns, and THF (tetrahydrofuran) as an eluant.

The GPC is performed at a sample concentration of 0.45% by mass, at a flow rate of 0.35 mL/min, with an amount of sample injected of 10 μL, and at a measurement temperature of 40° C. by using a differential refractive index (RI) detector.

A calibration curve is prepared from eight samples of "Standard sample TSK standard, polystyrene" available from Tosoh Corporation: "F-40", "F-20", "F-4", "F-1", "A-5000", "A-2500", and "A-1000" and "n-propylbenzene".

The vinyl chloride-vinyl acetate copolymer may be a commercially available product.

Examples of the commercially available product include vinyl chloride-vinyl acetate copolymers available from Wacker Chemie AG, and SOLBIN CL, CNL, C5R, TA3, and TA5R available from Nissin Chemical Industry Co., Ltd.

The content of the vinyl chloride-vinyl acetate copolymer contained in the clear ink is preferably 0.5% by mass to 10.0% by mass, more preferably 1.0% by mass to 6.0% by mass, still more preferably 1.5% by mass to 5.0% by mass, still more preferably 1.5% by mass to 4.5% by mass relative to the total amount of the clear ink.

When the content of the vinyl chloride-vinyl acetate copolymer is 0.5% by mass or more, the peel strength between the lamination substrate and the recording medium in the thermal fusion product further improves.

When the content of the vinyl chloride-vinyl acetate copolymer is 10.0% by mass or less, the ejection performance of the clear ink further improves.

Organic Solvent

The clear ink contains at least one organic solvent.

As the organic solvent, publicly known organic solvents that can be used for ink compositions can be used. Examples of the publicly known organic solvents include organic solvents described in Solvent pocketbook, new edition (edited by The Society of Synthetic Organic Chemistry, Japan, published in 1994).

The organic solvent is preferably an organic solvent having a boiling point of 150° C. or higher and 250° C. or lower, more preferably an organic solvent having a boiling point of 150° C. or higher and 200° C. or lower from the viewpoint of further improving an ejection performance when the clear ink is ejected from an ink jet head (hereinafter, also simply referred to as "clear ink ejection performance").

Hereinafter, the boiling point may be denoted by "BP".

Examples of the organic solvent include (poly)alkylene glycol monoalkyl ethers such as diethylene glycol monoethyl ether, triethylene glycol monomethyl ether, dipropylene glycol monomethyl ether, and tripropylene glycol monomethyl ether; (poly)alkylene glycol dialkyl ethers such as ethylene glycol dibutyl ether, diethylene glycol dimethyl ether, diethylene glycol diethyl ether, dipropylene glycol diethyl ether, and tetraethylene glycol dimethyl ether; (poly) alkylene glycol acetates such as diethylene glycol acetate; (poly)alkylene glycol diacetates such as ethylene glycol diacetate and propylene glycol diacetate; (poly)alkylene glycol monoalkyl ether acetates such as ethylene glycol monobutyl ether acetate and propylene glycol monomethyl ether acetate; ketones such as methyl ethyl ketone and cyclohexanone; lactones such as γ-butyrolactone; esters such as ethyl acetate, propyl acetate, butyl acetate, 3-methoxybutyl acetate, methyl propionate, and ethyl propionate; cyclic ethers such as tetrahydrofuran and dioxane; and amides such as dimethylformamide and dimethylacetamide.

The (poly)alkylene glycol is preferably (poly)ethylene glycol and/or (poly)propylene glycol.

From the viewpoint of the ejection performance of the clear ink, the organic solvent is preferably at least one selected from the group consisting of alkylene glycol monoalkyl ether acetates, alkylene glycol monoalkyl ethers, alkylene glycol dialkyl ethers, alkylene glycol acetates, polyalkylene glycol monoalkyl ether acetates, polyalkylene glycol monoalkyl ethers, polyalkylene glycol dialkyl ethers, polyalkylene glycol acetates, ketones, lactones, and esters; more preferably at least one selected from the group consisting of alkylene glycol monoalkyl ether acetates, alkylene glycol dialkyl ethers, polyalkylene glycol monoalkyl ether acetates, polyalkylene glycol dialkyl ethers, ketones, lactones, and esters; still more preferably at least one selected from the group consisting of polyalkylene glycol dialkyl ethers and esters.

The organic solvent particularly preferably includes at least one of diethylene glycol diethyl ether (DEGDEE) or 3-methoxybutyl acetate.

The content of the organic solvent contained in the clear ink is preferably 80% by mass or more, more preferably 90% by mass or more relative to the total amount of the clear ink.

The upper limit of the content of the organic solvent contained in the clear ink is preferably 98% by mass, although it depends on the contents of other components.

Surfactant

The clear ink may contain at least one surfactant.

Examples of the surfactant include surfactants described in JP1987-173463A (JP-S62-173463A) and JP1987-183457A (JP-S62-183457A).

Examples of the surfactant include anionic surfactants such as dialkyl sulfosuccinates, alkyl naphthalene sulfonates, and fatty acid salts; nonionic surfactants such as polyoxyethylene alkyl ethers, polyoxyethylene alkyl allyl ethers, acetylene glycols, and polyoxyethylene-polyoxypropylene block copolymers; and cationic surfactants such as alkylamine salts and quaternary ammonium salts.

Examples of the surfactant further include fluorine-containing surfactants (e.g., organic fluoro compounds) and silicone surfactants (e.g., polysiloxane compounds).

The organic fluoro compounds are preferably hydrophobic.

Examples of the organic fluoro compounds include fluorine-containing surfactants, oily fluorine-containing compounds (e.g., fluorinated oil), and solid fluorine-containing compound resins (e.g., tetrafluoroethylene resin) such as those described in JP1982-9053B (JP-S57-9053B) (the 8th to 17th columns) and JP1987-135826A (JP-S62-135826A).

The polysiloxane compounds are preferably modified polysiloxane compounds in which organic groups are introduced to some of methyl groups of dimethylpolysiloxane. Examples of the modification include, but are not particularly limited to, polyether modification, methyl styrene modification, alcohol modification, alkyl modification, aralkyl modification, aliphatic acid ester modification, epoxy modification, amine modification, amino modification, and mercapto modification. These modification methods may be used in combination.

The polysiloxane compounds are preferably polyether-modified polysiloxane compounds from the viewpoint of improving ink jet ejection stability.

Examples of the polyether-modified polysiloxane compounds include SILWET L-7604, SILWET L-7607N, SILWET FZ-2104, and SILWET FZ-2161 (all of which are available from NUC Corporation), BYK306, BYK307, BYK331, BYK333, BYK347, and BYK348 (all of which are available from BYK-Chemie GmbH), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (all of which are available from Shin-Etsu Chemical Co., Ltd.).

In the case where the clear ink contains a surfactant, the content of the surfactant is preferably 0.0001% by mass to 1% by mass relative to the total amount of the clear ink.

Resin Other than Vinyl Chloride-Vinyl Acetate Copolymer

The clear ink may contain at least one resin other than the vinyl chloride-vinyl acetate copolymer.

Examples of the resin other than the vinyl chloride-vinyl acetate copolymer include polyamide resins, polyurethane resins, cellulose resins, (meth)acrylic resins, polyolefin resins, and polyester resins.

The weight-average molecular weight of the resin is preferably 5,000 to 100,000, more preferably 10,000 to 100,000, still more preferably 20,000 to 80,000.

However, from the viewpoint of more effectively achieving the effect due to the vinyl chloride-vinyl acetate copolymer contained in the clear ink, particularly preferably, the clear ink contains no resin other than the vinyl chloride-vinyl acetate copolymer, or the content of the resin other than the vinyl chloride-vinyl acetate copolymer is 5% by mass or less (more preferably 3% by mass or less, still more preferably 2% by mass or less, still more preferably 1% by mass or less) relative to the total amount of the clear ink.

Other Components

The clear ink may contain other components other than the components described above.

The other components may be the same components as components that can be contained in a color ink described below.

However, as described above, the content of a colorant in the clear ink is less than 0.5% by mass (more preferably less than 0.1% by mass, particularly preferably 0% by mass).

The content of a polymerizable compound in the clear ink is preferably 3% by mass or less, more preferably 2% by mass or less, particularly preferably 1% by mass or less relative to the total amount of the clear ink.

The content of a polymerizable compound in the clear ink may be 0% by mass. That is, the clear ink may contain no polymerizable compound.

A polymerizable compound content of 3% by mass or less (including the case of 0% by mass) in the clear ink is advantageous from the viewpoint of improving the peel strength between the lamination substrate and the recording medium and improving suitability for lamination (that is, suitability for thermal fusion) in the case where the thermal fusion product is formed.

The clear ink may contain a small amount of water.

The clear ink is preferably a non-aqueous ink, which contains substantially no water.

Specifically, the water content is preferably 3% by mass or less, more preferably 2% by mass or less, particularly preferably 1% by mass or less relative to the total amount of the clear ink. The water content may be 0% by mass relative to the total amount of the clear ink.

Preferred physical properties (viscosity and surface tension) of the clear ink are the same as preferred physical properties of a color ink described below.

Color Ink

The ink set according to the present disclosure includes at least one color ink (that is, ink-jet color ink).

The color ink contains a colorant, an organic solvent, a polymerizable compound, and a photopolymerization initiator.

The color ink may contain other components as required.

Colorant

The color ink contains at least one colorant.

The colorant is not particularly limited and may be a pigment or a dye.

The colorant is preferably a pigment or an oil-soluble dye, particularly preferably a pigment from the viewpoint of good weather resistance and good color reproducibility.

The pigment is not particularly limited and can be appropriately selected according to the purpose. Examples of the pigment include publicly known organic pigments and inorganic pigments. Examples of the pigments further include resin particles dyed with a dye, and commercially available pigment dispersions and surface-treated pigments (e.g., dispersions obtained by dispersing pigments in, for example, resins in which the pigments are insoluble and which serve as dispersion media and pigments having surfaces grafted with resins).

Examples of such pigments include those described in "Ganryo no jiten (Encyclopedia of pigments" (published in 2000) edited by Seishirou Ito, W. Herbst, K. Hunger "Industrial Organic Pigments", JP2002-12607A, JP2002-188025A, JP2003-26978A, and JP2003-342503A.

Examples of the organic pigments and inorganic pigments include yellow pigments, magenta pigments, cyan pigments, green pigments, orange pigments, brown pigments, violet pigments, black pigments, and white pigments.

Regarding these pigments, for example, descriptions in paragraphs 0029 to 0042 of JP2011-94112A can be referred to, as required.

The color ink may contain only one colorant or two or more colorants.

The content of the colorant (in the case of two or more colorants, the total content thereof) in the color ink is preferably 0.5% by mass to 20% by mass, more preferably 1% by mass to 20% by mass, more preferably 1% by mass to 10% by mass relative to the total amount of the color ink.

Organic Solvent

The color ink contains at least one organic solvent.

Examples of the organic solvent that can be contained in the color ink are the same as examples of the organic solvents that can be contained in the clear ink.

From the viewpoint of the ejection performance of the color ink, preferred organic solvents are also the same as organic solvents that are preferred from the viewpoint of the ejection performance of the clear ink.

The content of the organic solvent contained in the color ink is preferably 50% by mass or more, more preferably 60% by mass or more relative to the total amount of the color ink.

The upper limit of the content of the organic solvent is preferably 95% by mass, more preferably 90% by mass, although it depends on the contents of other components.

Polymerizable Compound

The color ink contains at least one polymerizable compound.

In the present specification, "polymerizable compound" means a compound having a polymerizable group.

The polymerizable group in the polymerizable compound is preferably a group including an ethylenically unsaturated bond, more preferably a group including at least one of a vinyl group or a 1-methylvinyl group.

The polymerizable group is particularly preferably a (meth)acryloyl group from the viewpoint of polymerization reactivity and the hardness of a color image to be formed.

The weight-average molecular weight (Mw) of the polymerizable compound is preferably 30,000 or less, more preferably 20,000 or less, still more preferably 15,000 or less, still more preferably 8,000 or less from the viewpoint of the ejection performance of the color ink.

The weight-average molecular weight (Mw) of the polymerizable compound is preferably 1,000 or more, more preferably 1,500 or more, still more preferably 2,000 or more from the viewpoint of further improving the peel strength between the lamination substrate and the recording medium in the thermal fusion product.

From the viewpoint of further improving the peel strength between the lamination substrate and the recording medium in the thermal fusion product, the polymerizable compound is preferably a urethane (meth)acrylate, more preferably a bifunctional or higher urethane (meth)acrylate, still more preferably a bifunctional urethane (meth)acrylate.

From the viewpoint of further improving the peel strength between the lamination substrate and the recording medium in the thermal fusion product and further improving the ejection performance of the color ink, the polymerizable compound particularly preferably includes a bifunctional urethane (meth)acrylate having a weight-average molecular weight of 2,000 to 15,000.

When the color ink contains a bifunctional urethane (meth)acrylate, the color ink may contain a urethane (meth)acrylate (preferably a trifunctional or higher urethane (meth)acrylate) other than the bifunctional urethane (meth)acrylate. In such a case, the content of the urethane (meth)acrylate other than the bifunctional urethane (meth)acrylate is preferably smaller than the content of the bifunctional urethane (meth)acrylate.

The urethane (meth)acrylate may be a commercially available product.

Examples of the commercially available product of the bifunctional or higher urethane (meth)acrylate include CN9001 (available from SARTOMER), SHIKOH UV-3000B, SHIKOH UV-3200B, SHIKOH UV-3300B, SHIKOH UV-3310B, SHIKOH UV-6630B, SHIKOH UV-7550B, and SHIKOH UV-7600B (all of which are available from The Nippon Synthetic Chemical Industry Co., Ltd.), and UA-122P (available from Shin-Nakamura Chemical Co., Ltd.).

An example of the commercially available product of a monofunctional urethane (meth)acrylate is Photomer 4184 (available from IGM Resins).

The content of the polymerizable compound is preferably 0.3% by mass to 50% by mass, more preferably 3% by mass to 30% by mass, still more preferably 5% by mass to 20% by mass relative to the total amount of the color ink.

When the color ink contains a bifunctional urethane (meth)acrylate, the content of the bifunctional urethane (meth)acrylate is preferably 0.3% by mass to 50% by mass, more preferably 3% by mass to 30% by mass, still more preferably 5% by mass to 20% by mass relative to the total amount of the color ink.

Photopolymerization Initiator

The color ink contains at least one photopolymerization initiator.

The photopolymerization initiator is a compound that causes a chemical reaction when irradiated with active radiation (also referred to as "light" in the present specification) to generate a polymerization initiation species.

The photopolymerization initiator to be used can be appropriately selected from those sensitive to active radiation applied, such as ultraviolet rays in the range of 200 nm to 400 nm, far-ultraviolet rays, g-lines, h-lines, i-lines, KrF excimer laser beams, ArF excimer laser beams, electron beams, X-rays, molecular beams, or ion beams.

From the viewpoint of good curability and fixability of the color ink, the photopolymerization initiator is preferably a radical polymerization initiator.

Preferred examples of the photopolymerization initiator include (a) aromatic ketones, (b) aromatic onium salts, (c) organic peroxides, (d) hexaarylbiimidazole compounds, (e) ketoxime ester compounds, (f) borate compounds, (g) azinium compounds, (h) metallocene compounds, (i) active ester compounds, and (j) compounds having a carbon-halogen bond.

From the viewpoint of curability, the radical polymerization initiator is preferably an aromatic ketone.

The radical polymerization initiator is preferably an acylphosphine oxide compound.

Examples of the acylphosphine oxide compound that can be used include monoacylphosphine oxide compounds and bisacylphosphine oxide compounds. Publicly known monoacylphosphine oxide compounds can be used as the monoacylphosphine oxide compounds. Examples thereof include monoacylphosphine oxide compounds described in JP1985-8047B (JP-S60-8047B) and JP1988-40799B (JP-S63-40799B).

Specific examples of the monoacylphosphine oxide compounds include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-tert-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-tert-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bi s-diphenylphosphine oxide, pivaloyldiphenylphosphine oxide, p-tolyldiphenylphosphine oxide, 4-(tert-butyl)benzoyldiphenylphosphine oxide, 2-methylbenzoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

Publicly known bisacylphosphine oxide compounds can be used as the bisacylphosphine oxide compounds.

Examples of the bisacylphosphine oxide compounds include bisacylphosphine oxide compounds described in JP1991-101686A (JP-H03-101686A), JP1993-345790A (JP-H05-345790A), and JP1994-298818A (JP-H06-298818A).

Specific examples of the bisacylphosphine oxide compounds include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis (2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

The acylphosphine oxide compound is preferably bis(2,4,6-trimethylbenzoyl)-phenylphosphine oxide (IRGACURE 819: available from BASF), bis(2,6-dimethoxybenzoyl)-2,4,4-trimethylpentyl phenylphosphine oxide, 2,4,6-trimethylbenzoyl diphenyl phosphine oxide (DAROCUR TPO: available from BASF, LUCIRIN TPO: available from BASF), or 1-[4-(2-hydroxyethoxy)phenyl]-2-hydroxy-2-methyl-1-propan-1-one (IRGACURE 2959 available from BASF).

The color ink may contain, as a photopolymerization initiator, a compound functioning as a sensitizer (hereinafter, also simply referred to as a "sensitizer") in order to absorb specific active radiation and to accelerate decomposition of a polymerization initiator.

Examples of the sensitizer include polynuclear aromatic compounds (e.g., pyrene, perylene, triphenylene, and 2-ethyl-9,10-dimethoxyanthracene), xanthenes (e.g., fluorescein, eosin, erythrosine, Rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acriflavine), anthraquinones (e.g., anthraquinone), squaryliums (e.g., squarylium), and coumarins (e.g., 7-diethylamino-4-methylcoumarin).

The sensitizers may be used alone or in combination of two or more thereof.

When the color ink contains a photopolymerization initiator, the content of the photopolymerization initiator is preferably 0.1% by mass to 20% by mass, more preferably 0.5% by mass to 18% by mass, still more preferably 1% by mass to 15% by mass, still more preferably 1% by mass to 10% by mass relative to the total amount of the color ink.

Vinyl Chloride-Vinyl Acetate Copolymer

The color ink preferably contains at least one vinyl chloride-vinyl acetate copolymer.

In the case where the color ink contains a vinyl chloride-vinyl acetate copolymer, peel strength between a lamination substrate and a recording medium in a thermal fusion product having a layered structure of lamination substrate/clear ink layer/color image/recording medium further improves.

Preferred embodiments (such as Mw) of the vinyl chloride-vinyl acetate copolymer that can be contained in the color ink are the same as preferred embodiments of the vinyl chloride-vinyl acetate copolymer that can be contained in the clear ink.

In the case where the color ink contains a vinyl chloride-vinyl acetate copolymer, the content of the vinyl chloride-vinyl acetate copolymer contained in the color ink is preferably 0.1% by mass to 5.0% by mass, more preferably 0.2% by mass to 4.0% by mass, still more preferably 0.5% by mass to 2.0% by mass relative to the total amount of the color ink.

When the content of the vinyl chloride-vinyl acetate copolymer is 0.1% by mass or more, the peel strength between the lamination substrate and the recording medium in the thermal fusion product further improves.

When the content of the vinyl chloride-vinyl acetate copolymer is 5.0% by mass or less, the ejection performance of the color ink further improves.

In the case where the color ink contains a vinyl chloride-vinyl acetate copolymer, the total content of the polymerizable compound and the vinyl chloride-vinyl acetate copolymer that are contained in the color ink is preferably 4% by mass to 25% by mass, more preferably 10% by mass to 20% by mass relative to the total amount of the color ink.

When the total content of the polymerizable compound and the vinyl chloride-vinyl acetate copolymer is 4% by mass or more, the peel strength between the lamination substrate and the recording medium in the thermal fusion product further improves.

When the total content of the polymerizable compound and the vinyl chloride-vinyl acetate copolymer is 25% by mass or less, the ejection performance of the color ink further improves.

In the case where the color ink contains a vinyl chloride-vinyl acetate copolymer, Mt1, Mt2, Mc1, and Mc2 preferably satisfy a formula (1) below:

$$Mc2/Mc1 \leq Mt2/Mt1 \qquad \text{Formula (1)}$$

where Mt1 represents a total mass content of the nonvolatile component contained in the clear ink, Mt2 represents a mass content of the vinyl chloride-vinyl acetate copolymer contained in the clear ink, Mc1 represents a total mass content of the nonvolatile component contained in the color ink, and Mc2 represents a mass content of the vinyl chloride-vinyl acetate copolymer contained in the color ink.

When Mt1, Mt2, Mc1, and Mc2 satisfy the formula (1) above, the peel strength between the lamination substrate and the recording medium in the thermal fusion product having a layered structure of lamination substrate/clear ink layer/color image/recording medium further improves.

Needless to say, the formula (1) means that Mt2/Mt1 is 1 time Mc2/Mc1 or more.

Mt2/Mt1 is preferably 1.5 times Mc2/Mc1 or more, more preferably 5 times Mc2/Mc1 or more.

Mt2/Mt1 is preferably 15 times Mc2/Mc1 or less.

The meanings of the nonvolatile component contained in the color ink, Mc1, and Mc2 are respectively the same as the meanings of the nonvolatile component contained in the clear ink, Mt1, and Mt2 described above.

When the color ink contains an organic solvent, the total mass content (Mc1) of the nonvolatile component contained in the color ink corresponds to the total mass of the color ink except for the organic solvent.

In the case where a multicolor image is formed by using two or more color inks in a color image forming step, at least one of the two or more color inks and a clear ink preferably satisfy the formula (1) above, and all the two or more color inks and a clear ink particularly preferably satisfy the formula (1) above.

Polymerization Inhibitor

When the color ink contains a polymerizable compound, the color ink may further contain at least one polymerization inhibitor.

Examples of the polymerization inhibitor include nitroso polymerization inhibitors, hindered amine polymerization inhibitors, hindered phenol polymerization inhibitors, hydroquinone, benzoquinone, p-methoxyphenol, TEMPO, TEMPOL, and Cupferron Al.

When the color ink contains a polymerization inhibitor, the content of the polymerization inhibitor is preferably 0.02% by mass to 2% by mass relative to the total amount of the color ink.

Surfactant

The color ink may contain at least one surfactant.

Examples of the surfactant that can be contained in the color ink are the same as examples of the surfactants that can be contained in the clear ink.

When the color ink contains a surfactant, the content of the surfactant is preferably 0.0001% by mass to 1% by mass relative to the total amount of the color ink.

Polysiloxane Compound Having Acrylic Resin Chain

The color ink may contain at least one polysiloxane compound having an acrylic resin chain.

The polysiloxane compound having an acrylic resin chain is more preferably a compound having a polysiloxane chain and an acrylic resin chain, particularly preferably a polysiloxane compound to which an acrylic resin chain is grafted.

Examples of the polysiloxane compound having an acrylic resin chain include, but are not particularly limited to, CHALINE series available from Nissin Chemical Industry Co., Ltd. and SYMAC series available from Toagosei Co., Ltd.

When the color ink contains a polysiloxane compound having an acrylic resin chain, the content of the polysiloxane compound having an acrylic resin chain is preferably 0.01% by mass to 8% by mass, more preferably 0.1% by mass to 4% by mass, still more preferably 0.25% by mass to 1.5% by mass relative to the total amount of the color ink.

Dispersant

The color ink may contain at least one dispersant.

When the color ink contains a pigment as a colorant, the color ink preferably contains a dispersant.

The dispersant is preferably a high molecular weight dispersant.

Herein, "high molecular weight dispersant" means a dispersant having a weight-average molecular weight (Mw) of 1,000 or more.

Examples of the high molecular weight dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (available from BYK Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580, and EFKA7701 (available from EFKA additives); DISPERSE AID 6, DISPERSE AID 8, DISPERSE AID 15, and DISPERSE AID 9100 (available from San Nopco Limited); various SOLSPERSE dispersants such as SOLSPERSE 3000, 5000, 9000, 12000, 13240, 13940, 17000, 22000, 24000, 26000, 28000, 32000, 36000, 39000, 41000, and 71000 (available from Noveon); ADEKA PLURONIC L31, F38, L42, L44, L61, L64, F68, L72, P95, F77, P84, F87, P94, L101, P103, F108, L121, and P-123 (available from ADEKA Corporation); IONET S-20 (available from Sanyo Chemical Industries, Ltd.); DISPARLON KS-860, 873 SN, and 874 (high molecular weight dispersant); and #2150 (aliphatic polycarboxylic acid) and #7004 (polyether ester-type) (available from Kusumoto Chemicals, Ltd.).

When the color ink contains a dispersant, the color ink may contain only one dispersant or two or more dispersants.

When the color ink contains a dispersant, the content of the dispersant (in the case of two or more dispersants, the total content thereof) is preferably 0.05% by mass to 10% by mass, more preferably 0.1% by mass to 5% by mass relative to the total amount of the color ink.

Other Components

The color ink may contain other components other than the components described above.

Examples of the other components include publicly known additives such as ultraviolet absorbers, antioxidants, anti-fading agents, surface conditioners, leveling agents, matting agents, waxes, anti-foaming agents, pH adjusters, charge-imparting agents, bactericides, preservatives, deodorizers, charge control agents, wetting agents, anti-skinning agents, perfumes, and pigment derivatives.

The color ink may contain a small amount of water.

The color ink is preferably a non-aqueous ink, which contains substantially no water.

Specifically, the water content is preferably 3% by mass or less, more preferably 2% by mass or less, particularly preferably 1% by mass or less relative to the total amount of the color ink. The water content may be 0% by mass relative to the total amount of the color ink.

Preferred Physical Properties

From the viewpoint of suppressing bleeding at the time of landing of the color ink, the color ink preferably has a viscosity of 1 mPa·s to 40 mPa·s at 25° C., more preferably 3 mPa·s to 30 mPa·s at 25° C.

From the viewpoint of suppressing bleeding at the time of landing of the color ink, the color ink preferably has a viscosity of 1 mPa·s to 30 mPa·s, more preferably 3 mPa·s to 25 mPa·s at an ejection temperature (preferably 25° C. to 80° C., more preferably 25° C. to 50° C.) when the color ink is ejected from an ink jet head.

The method for measuring a viscosity of the color ink is not particularly limited but is preferably a method using a cone rotor/plate viscometer (for example, Model RE80 viscometer available from Toki Sangyo Co., Ltd.) corresponding to type-E.

In this method, the viscosity of the color ink is preferably measured by using a rotor with a rotor code No. 1 at a number of rotations of 10 rpm (rounds per minute). However, with regard to a color ink having a higher viscosity than 60 mPa·s, preferably, the number of rotations is changed to, for example, 5 rpm, 2.5 rpm, 1 rpm, or 0.5 rpm, as required, and the measurement is performed.

From the viewpoint of appropriately ejecting droplets by an ink jet method, the color ink preferably has a surface tension of 18 mN/m or more and 50 mN/m or less at 25° C., more preferably 20 mN/m or more and 40 mN/m or less at 25° C.

The surface tension of the color ink is a value measured by the Wilhelmy method at a liquid temperature of 25° C. using a commonly used surface tensiometer (for example, a CBVP-Z surface tensiometer available from Kyowa Interface Science, Co., Ltd.).

Laminate A

Next, a description will be made of a laminate A that is suitably produced by using the above-described ink set according to the present disclosure.

The laminate A includes a recording medium, a color image which is disposed on the recording medium and which is ink jet recorded matter (that is, a color image formed by an ink jet method), and a clear ink layer disposed on at least the color image on the recording medium and containing a vinyl chloride-vinyl acetate copolymer.

Specifically, the laminate A is the above-described laminate having the layered structure of clear ink layer/color image/recording medium.

The ink set according to the present disclosure is suitable for forming the color image and the clear ink layer in the laminate A.

In the laminate A, a ratio of a mass of the vinyl chloride-vinyl acetate copolymer contained in the clear ink layer to a total mass of the clear ink layer (that is, a ratio [mass content of vinyl chloride-vinyl acetate copolymer contained in clear ink layer/total mass of clear ink layer]) corresponds to the Mt2/Mt1 described above (specifically, is 0.40 or more).

A preferred range of the ratio [mass content of vinyl chloride-vinyl acetate copolymer contained in clear ink layer/total mass of clear ink layer] is the same as the preferred range of the Mt2/Mt1.

In the case where a lamination substrate is further thermally fused to the clear ink layer of this laminate A (that is, in the case where a thermal fusion product having a layered structure of lamination substrate/clear ink layer/color image/recording medium is formed), the laminate A has good peel strength between the recording medium and the lamination substrate. That is, in the case of forming the thermal fusion product, separation between the recording medium and the lamination substrate is suppressed.

The recording medium preferably contains at least one of a urethane resin or a vinyl chloride resin.

The thermal melting point of the urethane resin and the thermal melting point of the vinyl chloride resin are each close to the thermal melting point of the vinyl chloride-vinyl acetate copolymer contained in the clear ink layer.

Therefore, in the case where the recording medium contains at least one of a urethane resin or a vinyl chloride resin, the effect of improving the peel strength is significantly exhibited when the thermal fusion product is produced.

In the recording medium, the total content of the urethane resin and the vinyl chloride resin is preferably 60% by mass, more preferably 80% by mass or more, still more preferably 90% by mass or more relative to the total of the recording medium.

In the recording medium, the total content of the urethane resin and the vinyl chloride resin may be 100% by mass.

The recording medium preferably contains a vinyl chloride resin. The recording medium particularly preferably contains a vinyl chloride resin in an amount of 60% by mass (more preferably 80% by mass or more, still more preferably 90% by mass or more) relative to the total of the recording medium.

The recording medium may contain other components (such as publicly known additives for resins) other than the urethane resin and the vinyl chloride resin.

The recording medium may be colored in, for example, white.

In this case, the visual quality of the color image formed on the recording medium improves.

Examples of the colored recording medium include a recording medium that contains at least one of a urethane resin or a vinyl chloride resin and a colorant (e.g., a white pigment), and a recording medium having a multilayer structure that includes a substrate layer containing at least one of a urethane resin or a vinyl chloride resin and a layer containing a colorant (e.g., a white pigment).

The shape of the recording medium is not particularly limited but is preferably a sheet shape from the viewpoint of workability of thermal fusion in the case of forming a thermal fusion product having a layered structure of lamination substrate/clear ink layer/color image/recording medium.

The thickness of the sheet-like recording medium is not particularly limited but is preferably 0.1 mm to 20 mm, more preferably 0.2 mm to 10 mm, particularly preferably 0.5 mm to 5 mm.

The recording medium may be a commercially available product.

Examples of the commercially available product of the recording medium include a polyvinyl chloride substrate "PVC35phr" available from Okamoto Industries, Inc. and a polyurethane leather "ERNA (YP528)" available from Yamaplas Co., Ltd.

The clear ink layer preferably has transparency. In this case, the color image has superior clarity when the color image is viewed from the lamination substrate side in the thermal fusion product.

Herein, "having transparency" means that a transmittance of visible light having a wavelength of 400 nm to 700 nm is 80% or more (preferably 90% or more).

The laminate A preferably further includes a lamination substrate that is thermally fused to the clear ink layer.

The laminate A of this embodiment is a thermal fusion product having a layered structure of lamination substrate/clear ink layer/color image/recording medium.

The lamination substrate is preferably a lamination substrate that contains at least one of a urethane resin or a vinyl chloride resin. In this case, the peel strength between the lamination substrate and the recording medium further improves in the thermal fusion product.

In the lamination substrate, the total content of the urethane resin and the vinyl chloride resin is preferably 60% by mass, more preferably 80% by mass or more, still more preferably 90% by mass or more relative to the total of the lamination substrate.

In the lamination substrate, the total content of the urethane resin and the vinyl chloride resin may be 100% by mass.

The lamination substrate preferably contains a vinyl chloride resin. The lamination substrate particularly preferably contains a vinyl chloride resin in an amount of 60% by mass (more preferably 80% by mass or more, still more preferably 90% by mass or more) relative to the total of the lamination substrate.

The lamination substrate may contain others component (such as publicly known additives for resins) other than the urethane resin and the vinyl chloride resin.

The lamination substrate preferably has transparency. In this case, the color image has superior clarity when a thermal fusion product having a layered structure of lamination substrate/clear ink layer/color image/recording medium is formed and the color image is viewed from the lamination substrate side.

The meaning of "having transparency" is the same as that described above.

The thickness of the lamination substrate is not particularly limited but is preferably 30 µm to 200 µm, more preferably 40 µm to 150 µm, particularly preferably 50 µm to 100 µm.

The lamination substrate may be a commercially available product.

Examples of the commercially available product of the lamination substrate include a polymeric vinyl chloride laminated film "SG800" available from KN Trading Co., Ltd. and a urethane sheet "Higress (registered trademark)" available from NTW Co., Ltd.

The thermal fusion product having the above-described layered structure of lamination substrate/clear ink layer/color image/recording medium is particularly suitable as, for example, a flooring or a wall material of transport equipment (such as a train or a bus) or a flooring or a wall material of buildings.

One Example of Method for Producing Laminate A (Production Method X)

Next, one example of a method for producing the laminate A described above (hereinafter, also referred to as a production method X) will be described.

The production method X can be suitably performed by using the above-described ink set according to the present disclosure.

The production method X has a step of forming a color image by applying a color ink to a recording medium by an ink jet method, and a step of forming a clear ink layer by applying a clear ink to at least the color image.

The color ink in the ink set according to the present disclosure is suitable as the color ink in the production method X, and the clear ink in the ink set according to the present disclosure is suitable as the clear ink in the production method X.

The recording medium in the production method X is synonymous with the recording medium in the laminate A, and preferred embodiments thereof are also the same.

Step of Forming Color Image

The production method X has a step of forming a color image by applying a color ink to a recording medium by an ink jet method (hereinafter, also referred to as a "color image forming step").

In the color image forming step, a color image of one color may be formed by using only one color ink, or a color image of two or more colors may be formed by using two or more color inks.

The color ink is as described in the section of the ink set according to the present disclosure.

Needless to say, the application of the color ink by the ink jet method is performed by ejecting a color ink from an ink jet head included in an ink jet recording apparatus toward a recording medium.

The ejection conditions such as the amount of color ink ejected are not particularly limited and can be appropriately selected in accordance with, for example, the composition and physical properties of the color ink used.

The ink jet recording apparatus is not particularly limited. A publicly known ink jet recording apparatus that can achieve a desired resolution can be freely selected and used. That is, any publicly known ink jet recording apparatus including a commercially available product can apply a color ink by the ink jet method.

An ink supply system included in an ink jet recording apparatus includes, for example, a source tank including a color ink, a supply pipe, an ink supply tank disposed immediately upstream of an ink jet head, a filter, and a piezoelectric ink jet head.

The piezoelectric ink jet head can be driven so as to eject multi-size dots preferably with volumes of 1 pL to 100 pL, more preferably 8 pL to 30 pL, preferably at a resolution of 320×320 dpi to 4,000×4,000 dpi, more preferably 400×400 dpi to 1,600×1,600 dpi, still more preferably 720×720 dpi.

As used in the present specification, "dpi (dot per inch)" refers to the number of dots per 2.54 cm.

In the color image forming step, preferably, the color ink applied to the recording medium is dried to form a color image.

The drying of the color ink applied to the recording medium may be air drying or drying by heating. However, the drying is preferably drying by heating.

The heating temperature in heating is preferably 30° C. to 90° C., more preferably 50° C. to 80° C. in terms of the temperature of the recording medium.

In the color image forming step, the color ink applied to the recording medium is preferably irradiated with active radiation. The irradiation with active radiation causes polymerization of a polymerizable compound in the color ink on the recording medium, and the color ink is cured to form an image. As a result, a color image with good strength is obtained.

Examples of the active radiation that can be used include a-rays, y-rays, electron beams, X-rays, ultraviolet rays (UV), visible light, and infrared light.

The peak wavelength of the active radiation is preferably 200 nm to 600 nm, more preferably 300 nm to 450 nm, still more preferably 320 nm to 420 nm, still more preferably 340 nm to 400 nm.

For example, mercury lamps, metal halide lamps, gas lasers, and solid-state lasers are widely known as active radiation sources.

However, mercury-free devices are currently highly desirable from the viewpoint of environmental conservation, and replacing the above-exemplified active radiation sources with GaN-based semiconductor ultraviolet light-emitting devices is very useful from the industrial and environmental viewpoints. Furthermore, light-emitting diodes (LEDs) and laser diodes (LDs) are expected as light sources for photocurable ink jet applications because of their small size, long service life, high efficiency, and low cost.

Light-emitting diodes (LEDs) and laser diodes (LDs) can be used as the active radiation sources. In particular, in the case where an ultraviolet light source is required, ultraviolet LEDs (hereinafter, also referred to as UV-LEDs) and ultraviolet LDs (hereinafter, also referred to as UV-LDs) can be used. For example, UV-LEDs having main emission spectra at wavelengths between 365 nm and 420 nm are available from Nichia Corporation. U.S. Pat. No. 6,084,250A discloses an UV-LED capable of emitting active radiation centered between 300 nm and 370 nm. In addition, other UV-LEDs capable of emitting ultraviolet rays having wavelengths different from these wavelengths are also available.

Preferred active radiation sources are UV-LEDs. Particularly preferred active radiation sources are UV-LEDs having peak wavelengths of 340 nm to 400 nm.

The maximum illuminance of LEDs on the recording medium is preferably 10 mW/cm$^2$ to 2,000 mW/cm$^2$, more preferably 20 mW/cm$^2$ to 1,000 mW/cm$^2$, particularly preferably 50 mW/cm$^2$ to 800 mW/cm$^2$.

A color ink containing a polymerizable compound is suitably irradiated with such active radiation preferably for 0.01 seconds to 120 seconds, more preferably 0.1 seconds to 90 seconds.

Conditions for irradiation with active radiation and a basic method for irradiation with active radiation are disclosed in JP1985-132767A (JP-S60-132767A).

When the color ink is cured by irradiation with active radiation, curing may also be completed with another light source that is not driven.

WO99/54415A discloses, as irradiation methods, a method using an optical fiber and a method for irradiating a recording portion with UV light by directing a collimated light source onto a mirror surface provided on a side surface of a head unit. Such curing methods can also be used in the color image forming step.

In the case where irradiation with active radiation is conducted in the color image forming step, the irradiation dose of the active radiation is preferably 10 mJ/m² to 1,000 mJ/m², more preferably 100 mJ/m² to 500 mJ/m², still more preferably 200 mJ/m² to 400 mJ/m².

In the color image forming step, the color ink applied to the recording medium is preferably subjected to both heating and irradiation with active radiation and more preferably subjected to heating and irradiation with active radiation in this order.

Step of Forming Clear Ink Layer

The production method X has a step of forming a clear ink layer by applying a clear ink to at least the color image (hereinafter, also referred to as a "clear ink layer forming step").

In the clear ink layer forming step, a clear ink layer may be formed only on a color image, or a clear ink layer extending to a color image and a non-image-forming region may be formed.

Herein, "non-image-forming region" refers to a region where no color image is formed (that is, a region to which no color ink is applied) in the color image forming step.

The clear ink can be applied by using a publicly known method such as a coating method, an ink jet method, or an immersion method.

Examples of the coating method include publicly known coating methods using a bar coater (e.g., a wire bar coater), an extrusion die coater, an air doctor coater, a blade coater, a rod coater, a knife coater, a squeeze coater, a reverse roll coater, a gravure coater, a flexographic coater, or the like.

The details of the ink jet method are the same as those of the ink jet method in the color image forming step described above.

The clear ink is preferably applied by the ink jet method from the viewpoint that a production apparatus for producing a laminate having a layered structure of clear ink layer/color image/recording medium can be simplified.

In the clear ink layer forming step, preferably, a clear ink layer is formed by heating the clear ink applied to the recording medium.

Drying of the clear ink (that is, removal of an organic solvent from the clear ink) can be efficiently performed by heating.

Preferred heating temperatures in the case of heating the clear ink on the recording medium are the same as preferred heating temperatures in the case of heating the color ink on the recording medium.

In the case where the clear ink contains a polymerizable compound, the clear ink applied to the recording medium is preferably irradiated with active radiation. The irradiation with active radiation causes polymerization of the polymerizable compound in the clear ink on the recording medium. As a result, a cured clear ink layer is obtained.

Preferred embodiments of active radiation and irradiation conditions for active radiation are the same as those of preferred embodiments in the case where a color ink on a recording medium is irradiated with active radiation.

In the case where the clear ink contains an organic solvent and a polymerizable compound, in the clear ink layer forming step, the clear ink applied to the recording medium is preferably subjected to both heating and irradiation with active radiation and more preferably subjected to heating and irradiation with active radiation in this order.

Step of Thermally Fusing Lamination Substrate

The production method X preferably further has a step of thermally fusing a lamination substrate on the clear ink layer (hereinafter, also referred to as a "thermal fusion step").

Through this thermal fusion step, a thermal fusion product having a layered structure of lamination substrate/clear ink layer/color image/recording medium is formed. The formed thermal fusion product has good peel strength between the lamination substrate ad the recording medium as described above.

The lamination substrate as used herein is synonymous with the lamination substrate in the laminate A, and preferred embodiments thereof are also the same.

A thermal fusion temperature in the thermal fusion step is preferably 140° C. to 230° C., more preferably 150° C. to 220° C., still more preferably 170° C. to 190° C.

When the thermal fusion temperature is 140° C. or higher, the peel strength between the lamination substrate and the recording medium further improves.

When the thermal fusion temperature is 230° C. or lower, color image irregularities due to thermal fusion are further suppressed.

Herein, the thermal fusion temperature means a surface temperature of a lamination substrate during thermal fusion.

A thermal fusion pressure in the thermal fusion step is preferably 1.0 N/cm² to 10.0 N/cm², more preferably 2.0 N/cm² to 6.0 N/cm².

A thermal fusion time in the thermal fusion step is preferably 2 seconds to 60 seconds, more preferably 3 seconds to 20 seconds.

EXAMPLES

Examples of the present disclosure will now be described, but the present disclosure is not limited to Examples below.

Note that "part" and "%" are on a mass basis unless otherwise specified.

The details of individual components used in Examples and Comparative Examples are shown below.

Colorant
  PB15:4: C.I. Pigment Blue 15:4 available from BASF (HELIOGEN BLUED 7110 F), cyan pigment
  Mixed crystal quinacridone: CINQUASIA MAGENTA L 4540 available from BASF, magenta pigment
  PY155: C.I. Pigment Yellow 155 available from Clariant (INK JET YELLOW 4GC), yellow pigment
  Carbon black: Carbon black "MOGUL E" available from CABOT Corporation, black pigment
Dispersant
  Sol32000: "SOLSPERSE 32000" available from Lubrizol Corporation
Organic Solvent
  The details of organic solvents used in Examples and Comparative Examples are shown in Table 1.
  Hereinafter, "BP" means a boiling point.

TABLE 1

| Compound name | BP | Manufacturer |
|---|---|---|
| Ethylene glycol monomethyl ether (EGMME) | 125° C. | |
| 3-Methoxybutyl acetate | 172° C. | Tokyo Chemical Industry Co., Ltd. |
| Diethylene glycol diethyl ether (DEGDEE) | 188° C. | |
| Triethylene glycol monobutyl ether (TEGMBE) | 278° C. | |

Polymerizable Compound
  The details of polymerizable compounds (more specifically, urethane (meth)acrylates) used in Examples and Comparative Examples are shown in Table 2.

TABLE 2

| Compound name | Product name | Number of functionality | Mw | Manufacturer |
|---|---|---|---|---|
| Urethane (meth)acrylate | CN9001 | 2 | 3250 | SARTOMER |
| | Photomer4184 | 1 | 215 | IGM Resins |
| | UA-122P | 2 | 1100 | Shin-Nakamura Chemical Co., Ltd. |
| | SHIKOH UV-6630B | 2 | 3000 | The Nippon Synthetic Chemical Industry Co., Ltd. |
| | SHIKOH UV-3000B | 2 | 18000 | |
| | SHIKOH UV-7550B | 3 | 2400 | |
| | SHIKOH UV-7600B | 6 | 1400 | |

Vinyl Chloride-Vinyl Acetate Copolymer

The details of vinyl chloride-vinyl acetate copolymers used in Examples and Comparative Examples are shown in Table 3.

TABLE 3

| Compound name | | Mw | Vinyl chloride (mass %) | Vinyl acetate (mass %) | Manufacturer |
|---|---|---|---|---|---|
| Vinyl chloride-vinyl acetate copolymer | vinnol H15/42 | 18800 | 86 | 14 | Wacker Chemie AG |
| | vinnol H15/50 | 30000 | 85 | 15 | |
| | vinnol H14/45M | 19600 | 84 | 15 | |
| | vinnol H14/36 | 16000 | 85.6 | 14.4 | |
| | vinnol E15/45 | 13000 | 84.9 | 15.1 | |

Polymerization Inhibitor

UV22: "IRGASTAB (registered trademark) UV22" available from BASF, (Poly[oxy(methyl-1,2-ethanediyl)]-α, α', α"-1,2,3-propanetriyltris[-[(1-oxo-2-propen-1-yl)oxy]-2,6-bis(1,1-dimethylethyl)-4-(phenylenemethylene)cyclohexa-2,5-dien-1-one]; hindered phenol polymerization inhibitor)

Photopolymerization Initiator

Irg819: "IRGACURE (registered trademark) 819" available from BASF, (bis(2,4,6-trimethylbenzoyl)phenylphosphine oxide)

Irg2959: "IRGACURE (registered trademark) 2959" available from BASF, (1-[4-(2-hydroxyethoxy)phenyl]-2-hydroxy-2-methyl-1-propan-1-one)

Surfactant

BYK 331: "BYK (registered trademark) 331" available from BYK Chemie GmbH (polyether-modified polysiloxane compound)

Acrylic Resin

BR113: "DIANAL (registered trademark) BR113" available from Mitsubishi Chemical Corporation Polyester Resin LTH: "TEGO (registered trademark) AddBond LTH" available from Evonik Industries AG Polyvinyl Acetal Resin BL-10: "S-LEC (registered trademark) BL-10" available from Sekisui Chemical Co., Ltd.

Preparation of Pigment Mill Base (Pigment Dispersion)

The components other than the pigments were mixed (for 10 to 15 minutes at 2,000 to 3,000 rounds/min) so as to have the compositions in Table 4 with a mixer available from SILVERSON Machines Ltd. to prepare dispersant dilutions. The pigments were added to the corresponding dispersant dilutions, and the resulting mixtures were further stirred with the mixer (for 10 to 20 minutes at 2,000 to 3,000 round/min) to prepare 500 parts of preliminary dispersion liquids.

Subsequently, the preliminary dispersion liquids were each subjected to dispersion treatment with a circulation bead mill (SL-012C1) available from DISPERMAT to obtain pigment mill bases (pigment dispersions). This dispersion treatment was performed in the SL-012C1 charged with 200 parts of zirconia beads having a diameter of 0.65 mm at a rotation speed of 15 m/s for a dispersion time of one hour to six hours.

TABLE 4

| | Cyan pigment mill base | Magenta pigment mill base | Yellow pigment mill base | Black pigment mill base |
|---|---|---|---|---|
| Pigment | PB15:4 | Mixed crystal quinacridone | PY155 | Carbon black |
| | 30 mass % | 30 mass % | 30 mass % | 30 mass % |
| Dispersant | SOL32000 | SOL32000 | SOL32000 | SOL32000 |
| | 10 mass % | 15 mass % | 10 mass % | 10 mass % |
| DEGDEE | 60 mass % | 55 mass % | 60 mass % | 60 mass % |

Preparation of Color Ink Group

Color inks (cyan inks C1 to C9, magenta inks M1 to M9, yellow inks Y1 to Y9, and black inks K1 to K9) shown in Tables 5 to 13 below were prepared. Thus, color ink groups (CG1 to CG9) shown in Tables 5 to 13 below and each formed of a combination of a cyan ink, a magenta ink, a yellow ink, and a black ink were prepared.

The color inks were prepared by mixing the components shown in Tables 5 to 13 below in the respective amounts and stirring the components with a mixer available from SILVERSON Machines Ltd. (for 10 to 15 minutes at 2,000 to 3,000 round/min).

In Tables 5 to 13 below, the numerical values representing the amounts of components are represented by parts by mass.

The blanks in Tables 5 to 13 below mean that the corresponding components are not contained.

Tables 5 to 13 below also show a ratio (Mc2/Mc1) of a mass content (Mc2) of a vinyl chloride-vinyl acetate copolymer contained in a color ink to a total mass content (Mc1) of a nonvolatile component contained in the color ink.

TABLE 5

| Color Ink Group CG1 | | | | | |
|---|---|---|---|---|---|
| | | Color ink | | | |
| | | C1 | M1 | Y1 | K1 |
| Organic solvent | 3-Methoxybutyl acetate | 73.9 | 68.7 | 69.9 | 72.4 |
| Polymerizable compound | CN9001 | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

TABLE 6

Color Ink Group CG2

| | | Color ink | | | |
|---|---|---|---|---|---|
| | | C2 | M2 | Y2 | K2 |
| Organic solvent | 3-Methoxybutyl acetate | 73.9 | 68.7 | 69.9 | 72.4 |
| Polymerizable compound | CN9001 | 16 | 16 | 16 | 16 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0 | 0 | 0 | 0 |

TABLE 7

Color Ink Group CG3

| | | Color ink | | | |
|---|---|---|---|---|---|
| | | C3 | M3 | Y3 | K3 |
| Organic solvent | 3-Methoxybutyl acetate | 74.4 | 69.2 | 70.4 | 72.9 |
| Polymerizable compound | CN9001 | 15 | 15 | 15 | 15 |
| Vinyl chloride-vinyl acetate copolymer | vinnol H14/36 (Mw = 16000) | 0.5 | 0.5 | 0.5 | 0.5 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.02 | 0.02 | 0.02 | 0.02 |

TABLE 8

Color Ink Group CG4

| | | Color ink | | | |
|---|---|---|---|---|---|
| | | C4 | M4 | Y4 | K4 |
| Organic solvent | 3-Methoxybutyl acetate | 88.2 | 83 | 84.2 | 86.7 |
| Polymerizable compound | CN9001 | 0.5 | 0.5 | 0.5 | 0.5 |
| Vinyl chloride-vinyl acetate copolymer | vinnol H14/36 (Mw = 16000) | 4.4 | 4.4 | 4.4 | 4.4 |
| Polymerization inhibitor | UV22 | 0.2 | 0.2 | 0.2 | 0.2 |
| Photopolymerization initiator | Irg819 | 0.4 | 0.4 | 0.4 | 0.4 |
| | Irg2959 | 0.2 | 0.2 | 0.2 | 0.2 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.54 | 0.41 | 0.45 | 0.50 |

TABLE 9

Color Ink Group CG5

| | | Color ink | | | |
|---|---|---|---|---|---|
| | | C5 | M5 | Y5 | K5 |
| Organic solvent | 3-Methoxybutyl acetate | 73.9 | 68.7 | 69.9 | 72.4 |
| Polymerizable compound | UA-122P | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

TABLE 10

Color Ink Group CG6

| | | Color ink | | | |
|---|---|---|---|---|---|
| | | C6 | M6 | Y6 | K6 |
| Organic solvent | 3-Methoxybutyl acetate | 73.9 | 68.7 | 69.9 | 72.4 |
| Polymerizable compound | SHIKOH UV-6630B | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

TABLE 11

Color Ink Group CG7

| | | Color ink | | | |
|---|---|---|---|---|---|
| | | C7 | M7 | Y7 | K7 |
| Organic solvent | 3-Methoxybutyl acetate | 73.9 | 68.7 | 69.9 | 72.4 |
| Polymerizable compound | SHIKOH UV-3000B | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

TABLE 12

Color Ink Group CG8

| | | Color ink | | | |
|---|---|---|---|---|---|
| | | C8 | M8 | Y8 | K8 |
| Organic solvent | 3-Methoxybutyl acetate | 73.9 | 68.7 | 69.9 | 72.4 |
| Polymerizable compound | SHIKOH UV-7550B | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

TABLE 13

Color Ink Group CG9

| | | Color ink | | | |
|---|---|---|---|---|---|
| | | C9 | M9 | Y9 | K9 |
| Organic solvent | 3-Methoxybutyl acetate | 73.9 | 68.7 | 69.9 | 72.4 |
| Polymerizable compound | Photomer4184 | 14 | 14 | 14 | 14 |
| Vinyl chloride-vinyl acetate copolymer | vinnol H14/36 (Mw = 16000) | 2 | 2 | 2 | 2 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | | | |
| Magenta pigment mill base | | | 11.2 | | |
| Yellow pigment mill base | | | | 10 | |
| Black pigment mill base | | | | | 7.5 |
| Mc2/Mc1 | | 0.09 | 0.08 | 0.08 | 0.09 |

Preparation of Clear Ink

Clear inks T1 to T22 were prepared by mixing the components shown in Tables 14 to 16 below in the respective amounts and stirring the components with a mixer available from SILVERSON Machines Ltd. (for 10 to 15 minutes at 2,000 to 3,000 round/min).

In Tables 14 to 16 below, the numerical values representing the amounts of components are represented by parts by mass.

The blanks in Tables 14 to 16 below mean that the corresponding components are not contained.

The clear inks T2, T5, T6, T9, T12, T13, and T14 are clear inks for comparison.

Tables 14 to 16 below also show a ratio (Mt2/Mt1) of a mass content (Mt2) of a vinyl chloride-vinyl acetate copolymer contained in a clear ink to a total mass content (Mt1) of a nonvolatile component contained in the clear ink.

TABLE 14

| | | | Clear ink | | | | | |
|---|---|---|---|---|---|---|---|---|
| | | | T1 | T2 (Comparison) | T3 | T4 | T5 (Comparison) | T6 (Comparison) |
| Volatile component | Organic solvent | 3-Methoxybutyl acetate | 95.9 | 85.9 | 92 | 92 | 91.4 | 90.3 |
| Nonvolatile component | Vinyl chloride-vinyl acetate copolymer | vinnol H15/42 (Mw = 18800) | 4 | | 4 | 3.2 | 2.6 | 1.9 |
| | Polymerizable compound | CN9001 | | 5 | 1.1 | 1.5 | 2.1 | 3 |
| | | SHIKOH UV-7600B | | 5 | 1.1 | 1.5 | 2.1 | 3 |
| | Polymerization inhibitor | UV22 | | 1 | 0.2 | 0.2 | 0.2 | 0.2 |
| | Photopolymerization initiator | Irg819 | | 2 | 1 | 1 | 1 | 1 |
| | | Irg2959 | | 1 | 0.5 | 0.5 | 0.5 | 0.5 |
| | Surfactant | BYK 331 | 0.1 | 0.1 | 0.1 | 0.1 | 0.1 | 0.1 |
| | Mt2/Mt1 | | 0.98 | 0 | 0.50 | 0.40 | 0.30 | 0.20 |

TABLE 15

| | | | Clear ink | | | | | | | |
|---|---|---|---|---|---|---|---|---|---|---|
| | | | T7 | T8 | T9 (Comparison) | T10 | T11 | T12 (Comparison) | T13 (Comparison) | T14 (Comparison) |
| Volatile component | Organic solvent | 3-Methoxybutyl acetate | 96.8 | 96.5 | 96.3 | 96.8 | 96.5 | 96.3 | 95.9 | 95.9 |

TABLE 15-continued

|  |  |  | Clear ink | | | | | | | |
|---|---|---|---|---|---|---|---|---|---|---|
|  |  |  | T7 | T8 | T9 (Comparison) | T10 | T11 | T12 (Comparison) | T13 (Comparison) | T14 (Comparison) |
| Nonvolatile component | Vinyl chloride-vinyl acetate copolymer | vinnol H15/42 (Mw = 18800) | 1.6 | 1.4 | 1.1 | 1.6 | 1.4 | 1.1 | | |
|  | Acrylic resin | BR113 | 1.5 | 2 | 2.5 | | | | 4 | |
|  | Polyester resin | LTH | | | | 1.5 | 2 | 2.5 | | 4 |
|  | Surfactant | BYK 331 | 0.1 | 0.1 | 0.1 | 0.1 | 0.1 | 0.1 | 0.1 | 0.1 |
|  | Mt2/Mt1 | | 0.50 | 0.40 | 0.30 | 0.50 | 0.40 | 0.30 | 0.00 | 0.00 |

TABLE 16

|  |  |  | Clear ink | | | | | | | |
|---|---|---|---|---|---|---|---|---|---|---|
|  |  |  | T15 | T16 | T17 | T18 | T19 | T20 | T21 | T22 |
| Volatile component | Organic solvent | 3-Methoxybutyl acetate (BP = 172° C.) | 95.9 | 95.9 | 95.9 | 95.9 | 96.9 | 94.9 | | |
|  |  | EGMME (BP = 125° C.) | | | | | | | 95.9 | |
|  |  | TEGMBE (BP = 278° C.) | | | | | | | | 95.9 |
| Nonvolatile component | Vinyl chloride-vinyl acetate copolymer | vinnol H15/42 (Mw = 18800) | | | | | 3 | 5 | 4 | 4 |
|  |  | vinnol H15/50 (Mw = 30000) | 4 | | | | | | | |
|  |  | vinnol H14/45M (Mw = 19600) | | 4 | | | | | | |
|  |  | vinnol H14/36 (Mw = 16000) | | | 4 | | | | | |
|  |  | vinnol E15/45 (Mw = 13000) | | | | 4 | | | | |
|  | Surfactant | BYK 331 | 0.1 | 0.1 | 0.1 | 0.1 | 0.1 | 0.1 | 0.1 | 0.1 |
|  | Mt2/Mt1 | | 0.98 | 0.98 | 0.98 | 0.98 | 0.97 | 0.98 | 0.98 | 0.98 |

EXAMPLES 1 TO 24 AND COMPARATIVE EXAMPLES 1 TO 8

Preparation of Ink Set

Ink sets of Examples 1 to 24 and Comparative Examples 2 to 8 which were combinations of color ink groups and clear inks shown in Tables 17 and 18 were prepared. An ink set (free of clear ink) of Comparative Example 1 constituted by the color ink group shown in Table 17 was prepared.

Laminates were prepared and evaluated by using the ink sets prepared above. A detailed description thereof will be made below.

Preparation of Modified Ink Jet Printer

A modified ink jet printer was prepared by attaching a rubber heater (SR100, available from ThreeHigh Co., Ltd.) and a ultraviolet (UV) irradiation device (Vzero, available from Integration Technology) to an ink jet printer (KEGON) available from AFIT Corporation. The output of the rubber heater was set such that a recording medium to which an ink (a color ink, or a color ink and a clear ink) was applied could be heated to about 60° C. The drying time of the ink in the case of performing UV irradiation (specifically, the time from when the ink ejected from an ink jet head was landed on the recording medium until when the ink was irradiated with UV) was adjusted to 10 seconds. The drying time of the ink in this case was adjusted by adjusting a transport speed (5 m/min to 25 m/min) and the timing of opening and closing of a UV shutter.

Color Image Forming Step

Color images were formed on recording media by ejecting, from the ink jet head of the modified ink jet printer, color inks (a cyan ink, a magenta ink, a yellow ink, and a black ink) in the color ink sets described above. The image density was 1,200 dpi (dot per inch)×600 dpi.

Polyvinyl chloride substrates "PVC35phr" available from Okamoto Industries, Inc. were used as the recording media.

Three types of images of an image A to an image C described below were formed as the color images.

The image A was an image in which a cyan solid image, a magenta solid image, a yellow solid image, and a black solid image were arranged in two columns and two rows. The areas of these solid images were equal to each other. The amounts of the cyan ink, the magenta ink, the yellow ink, and the black ink applied were each 5 g/m² (that is, 20 g/m² in terms of the total amount of color inks applied).

The image B was a grid-like image constituted by a fine-line group in which black (K) fine-line images, cyan (C) fine-line images, magenta (M) fine-line images, and yellow (Y) fine-line images each extending in a vertical direction were arranged in a lateral direction, and a fine-line group in which black fine-line images, cyan fine-line images, magenta fine-line images, and yellow fine-line images each extending in the lateral direction were arranged in the vertical direction, the fine-line groups overlapping each other, as illustrated in FIG. 1.

The line width of each of the fine-line images was 1 mm. The gap between center lines of fine-line images (that is, the distance between a center line of a particular fine line in the line width direction and a center line of a fine line in the line width direction, the fine line being disposed adjacent to the particular fine line) was 3 mm.

The image C is an image in which the line width of each fine-line image in the image B was changed to 2 mm.

In the formation of each of the image A to the image C, after the completion of application of four color inks to a recording medium, the applied four color inks were subjected to heating (heating temperature: 60° C.) with the rubber heater and UV irradiation (UV wavelength: 385 nm, UV irradiation dose: 300 mJ/m$^2$) with the UV irradiation device in that order, thereby fixing the applied four color inks to the recording medium. Thus, the images were formed.

Clear Ink Layer Forming Step

In Examples 1 to 24 and Comparative Examples 2 to 8, the clear ink (any one of the clear inks T1 to T21) was ejected from the ink jet head of the modified ink jet printer to form a clear ink layer covering the whole of the color image (any one of the image A to the image C) and the non-image-forming region of the recording medium on which the color image was formed. The image density of the clear ink layer was 1,200 dpi×600 dpi. The amount of clear ink applied was 10 g/m$^2$.

In Comparative Example 1 in which an ink set including no clear ink was used, the formation of a clear ink layer was not performed.

The clear ink layer was formed by subjecting the clear ink applied to the recording medium on which the color image was formed to heating (without UV irradiation), or heating and UV irradiation in that order.

In more detail, in each of the examples in which the clear inks T2 to T6 including a polymerizable compound were used, a clear ink layer was formed by subjecting the applied clear ink to heating (heating temperature: 60° C.) and UV irradiation (UV irradiation dose: 300 mJ/m$^2$) in that order. In each of the examples in which the clear inks T1 and T7 to T22 including no polymerizable compound were used, a clear ink layer was formed by subjecting the applied clear ink to heating (heating temperature: 60° C.) (that is, without UV irradiation).

Thermal Fusion Step

In each of Examples 1 to 24 and Comparative Example 2 to 8, a transparent PVC substrate serving as a lamination substrate was disposed on the clear ink layer of the recording medium on which the color image and the clear ink layer were formed, and the lamination substrate and the recording medium on which the color image and the clear ink layer were formed were thermally fused by using a desktop heat press machine (desktop automatic transfer press machine AF-54TEN, available from Asahi Garment Machinery Co., Ltd.), thereby obtaining a thermal fusion product sample having a layered structure of lamination substrate/clear ink layer/color image/recording medium.

Here, a polymeric vinyl chloride laminated film "SG800" (thickness: 75 μm) available from KN Trading Co., Ltd. was used as the transparent PVC substrate (lamination substrate).

The lamination pressure (thermal fusion pressure) was 4.0 N/cm$^2$, the lamination temperature (thermal fusion temperature) was 180° C., and the lamination time (thermal fusion time) was 10 seconds.

In comparative Example 1, a transparent PVC substrate (lamination substrate) that was the same as that used in Examples 1 to 24 and Comparative Examples 2 to 8 was disposed on the color image of the recording medium on which the color image was formed, thermal fusion was performed under the same conditions as those of thermal fusion in Examples 1 to 24 and Comparative Examples 2 to 8 to obtain a thermal fusion product sample having a layered structure of lamination substrate/color image/recording medium.

Evaluation of Appearance of Color Image

The appearance of color images (the image B and the image C) was examined by visual observation from the lamination substrate side by using a thermal fusion product sample including the image B (that is, the grid-like image constituted by fine-line images each having a line width of 1 mm) and the image C (that is, the grid-like image constituted by fine-line images each having a line width of 2 mm). The appearance of the color images was evaluated in accordance with the evaluation criteria described below.

Tables 17 and 18 show the results.

In the evaluation criteria described below, "5" is the grade corresponding to the best appearance of color images.

Evaluation Criteria of Appearance of Color Image

5: In visual observation from a position 30 cm away from the images, neither fine-line image irregularities nor grid irregularities are observed in both the image B and the image C.

4: In visual observation from a position 30 cm away from the images, although fine-line image irregularities or grid irregularities are observed in the image B, neither fine-line image irregularities nor grid irregularities are observed in the image C.

3: In visual observation from a position 30 cm away from the images, fine-line image irregularities or grid irregularities are observed in both the image B and the image C. In visual observation from a position 1 m away from the images, neither fine-line image irregularities nor grid irregularities are observed in both the image B and the image C.

2: In visual observation from a position 30 cm away from the images, fine-line image irregularities or grid irregularities are observed in both the image B and the image C. In visual observation from a position 1 m away from the images, although fine-line image irregularities or grid irregularities are observed in the image B, neither fine-line image irregularities nor grid irregularities are observed in the image C.

1: In visual observation from a position 30 cm away from the images, fine-line image irregularities or grid irregularities are observed in both the image B and the image C. In visual observation from a position 1 m away from the images, fine-line image irregularities or grid irregularities are also observed in both the image B and the image C.

Evaluation of Peel Strength between Lamination Substrate and Recording Medium

A sample for evaluating peel strength was prepared by changing, as described below, the thermal fusion step in the preparation of a thermal fusion product sample including the image A.

A strip specimen having a size of 0.5 cm×10 cm and including a part of the image A (hereinafter, referred to as a "recording medium specimen") was obtained from a recording medium on which a color image and a clear ink layer were formed (in Comparative Example 1, a recording medium on which a color image was formed).

Similarly, a strip specimen having a size of 0.5 cm×10 cm (hereinafter, referred to as a "lamination substrate specimen") was obtained from a lamination substrate.

A PTFE (polytetrafluoroethylene) sheet was disposed in a region of 0.5 cm×3 cm including one end of the recording medium specimen in the longitudinal direction on the clear ink layer of the recording medium specimen (in Comparative Example 1, on the color image of the recording medium specimen, hereinafter the same). Next, the lamination substrate specimen having a size of 0.5 cm×10 cm was disposed so as to cover the whole of the region on which the PTFE sheet was disposed (region of 0.5 cm×3 cm) and the remaining region (region of 0.5 cm×7 cm) on the cleat ink layer of the recording medium specimen.

In this state, the recording medium specimen and the lamination substrate specimen were thermally fused under the same conditions as those in the thermal fusion step in the preparation of a thermal fusion product sample including the image A. The PTFE sheet was removed from the resulting laminate to obtain a sample for evaluating peel strength.

Figure 2:
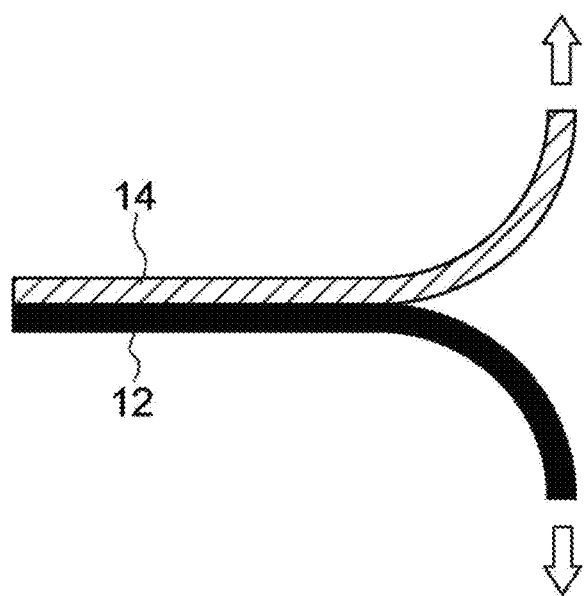
FIG. 2 is a schematic sectional view that conceptually illustrates a section of a sample for evaluating peel strength in Examples, the section being parallel to a thickness direction and a longitudinal direction of the sample.

FIG. 2 is a schematic sectional view that conceptually illustrates a section of a sample for evaluating peel strength, the section being parallel to a thickness direction and a longitudinal direction of the sample.

As illustrated in FIG. 2, in this sample for evaluating peel strength, a recording medium specimen 14 (in more detail, a clear ink layer of a recording medium specimen in Examples 1 to 24 and Comparative Examples 2 to 8 and a color image of a recording medium specimen in Comparative Example 1) and a lamination substrate specimen 12 are thermally fused in a region of 0.5 cm×7 cm, but the recording medium specimen 14 and the lamination substrate specimen 12 are not thermally fused in a region where a PTFE sheet is disposed therebetween (that is, a region of 0.5 cm×3 cm).

Next, a tensile test was performed in which the non-thermally fused portion (end portion) of the recording medium specimen 14 and the non-thermally fused portion (end portion) of the lamination substrate specimen 12 in the sample for evaluating peel strength were pulled in the opposite directions (in the directions of the two block arrows in FIG. 2). This tensile test was performed by using a tensile tester (AUTOGRAPH AGS-X 5KN available from SHIMADZU Corporation).

The tensile test described above was performed 10 times. Specifically, ten samples for evaluating peel strength were prepared, and each of the samples for evaluating peel strength was subjected to the tensile test.

On the basis of the results of the tensile test performed ten times, the peel strength between the lamination substrate and the recording medium was evaluated in accordance with evaluation criteria described below.

Tables 17 and 18 show the results.

In the evaluation criteria described below, "10" is the grade corresponding to the best peel strength between the lamination substrate and the recording medium.

Evaluation Criteria of Peel Strength

10: The lamination substrate specimen and the recording medium specimen were not separated from each other ten times out of the ten tests, and the lamination substrate specimen or the recording medium specimen was broken.

9: The lamination substrate specimen and the recording medium specimen were not separated from each other nine times out of the ten tests, and the lamination substrate specimen or the recording medium specimen was broken.

8: The lamination substrate specimen and the recording medium specimen were not separated from each other seven or eight times out of the ten tests, and the lamination substrate specimen or the recording medium specimen was broken.

7: The lamination substrate specimen and the recording medium specimen were not separated from each other five or six times out of the ten tests, and the lamination substrate specimen or the recording medium specimen was broken.

6: The lamination substrate specimen and the recording medium specimen were not separated from each other three or four times out of the ten tests, and the lamination substrate specimen or the recording medium specimen was broken.

5: The lamination substrate specimen and the recording medium specimen were not separated from each other once or twice out of the ten tests, and the lamination substrate specimen or the recording medium specimen was broken.

4: The lamination substrate specimen and the recording medium specimen were separated from each other ten times out of the ten tests, and the average of the maximum stress in the ten tests was 2 MPa or more.

3: The lamination substrate specimen and the recording medium specimen were separated from each other ten times out of the ten tests, and the average of the maximum stress in the ten tests was 1.5 MPa or more and less than 2 MPa.

2: The lamination substrate specimen and the recording medium specimen were separated from each other ten times out of the ten tests, and the average of the maximum stress in the ten tests was 1.0 MPa or more and less than 1.5 MPa.

1: The lamination substrate specimen and the recording medium specimen were separated from each other ten times out of the ten tests, and the average of the maximum stress in the ten tests was less than 1.0 MPa.

Evaluation of Ejection Performance of Color Ink

An ejection performance of a color ink (hereinafter also referred to as an "ejection performance C") was evaluated as described below.

Images A (that is, the images A each constituted by four-color solid images) were continuously formed, by using A2-size recording sheets (ink-jet photographic paper, Kassai, available from FUJIFILM Corporation) as recording media, on 40 sheets of the recording sheets under the same conditions as those for forming the image A in the color image forming step. Hereinafter, the recording sheets on which the images A are formed are referred to as "samples for evaluating ejection performance C".

The 40 samples for evaluating ejection performance C were visually observed to determine the number of samples for evaluating ejection performance C, the samples having images in which nozzle failure (that is, an image defect caused by ejection failure of a nozzle) was observed. On the basis of the results, the ejection performance C was evaluated in accordance with the evaluation criteria described below.

Tables 17 and 18 show the results.

In the evaluation criteria described below, "10" is the grade corresponding to the best ejection performance C.

Evaluation Criteria of Ejection Performance of Color Ink (Ejection Performance C)

10: The number of samples in which nozzle failure is observed is 0.
9: The number of samples in which nozzle failure is observed is 1.
8: The number of samples in which nozzle failure is observed is 2.
7: The number of samples in which nozzle failure is observed is 3.
6: The number of samples in which nozzle failure is observed is 4.
5: The number of samples in which nozzle failure is observed is 5.
4: The number of samples in which nozzle failure is observed is 6.
3: The number of samples in which nozzle failure is observed is 7.
2: The number of samples in which nozzle failure is observed is 8.
1: The number of samples in which nozzle failure is observed is 9 or more.

Evaluation of Ejection Performance of Clear Ink

An ejection performance of a clear ink (hereinafter also referred to as an "ejection performance T") was evaluated as described below.

Clear solid images were continuously formed, by using A2-size recording sheets (ink-jet photographic paper, Kassai, available from FUJIFILM Corporation), as recording media, on 40 sheets of the recording sheets under the same conditions as those for forming the clear ink layer in the clear ink layer forming step. Hereinafter, the recording sheets on which the clear solid images are formed are referred to as "samples for evaluating ejection performance T".

The 40 samples for evaluating ejection performance T were visually observed to determine the number of samples for evaluating ejection performance T, the samples having images in which nozzle failure (that is, an image defect caused by ejection failure of a nozzle) was observed. On the basis of the results, the ejection performance T was evaluated in accordance with the evaluation criteria described below.

Tables 17 and 18 show the results.

In the evaluation criteria described below, "10" is the grade corresponding to the best ejection performance T.

This evaluation of the ejection performance of a clear ink (ejection performance T) was performed in Examples 1 to 24 and Comparative Examples 2 to 8. In Comparative Example 1 in which an ink set including no clear ink was used, the evaluation of the ejection performance of a clear ink was not performed.

Evaluation Criteria of Ejection Performance of Clear Ink (Ejection Performance T)

10: The number of samples in which nozzle failure is observed is 0.
9: The number of samples in which nozzle failure is observed is 1.
8: The number of samples in which nozzle failure is observed is 2.
7: The number of samples in which nozzle failure is observed is 3.
6: The number of samples in which nozzle failure is observed is 4.
5: The number of samples in which nozzle failure is observed is 5.
4: The number of samples in which nozzle failure is observed is 6.
3: The number of samples in which nozzle failure is observed is 7.
2: The number of samples in which nozzle failure is observed is 8.
1: The number of samples in which nozzle failure is observed is 9 or more.

TABLE 17

| | Color ink group | | | | | | Clear ink |
| --- | --- | --- | --- | --- | --- | --- | --- |
| | | Polymerizable compound | | | Vinyl chloride-vinyl acetate copolymer | | | Vinyl chloride-vinyl acetate copolymer |
| | Color ink group No. | Mw | Number of functionality | Amount (%) | Amount (%) | Mc2/Mc1 | Clear ink No. | Mw |
| Example 1 | CG1 | 3250 | 2 | 14 | 2 | 0.08 to 0.09 | T1 | 18800 |
| Comparative Example 1 | CG1 | 3250 | 2 | 14 | 2 | 0.08 to 0.09 | None | — |
| Comparative Example 2 | CG1 | 3250 | 2 | 14 | 2 | 0.08 to 0.09 | T2 | — |
| Example 2 | CG1 | 3250 | 2 | 14 | 2 | 0.08 to 0.09 | T3 | 18800 |
| Example 3 | CG1 | 3250 | 2 | 14 | 2 | 0.08 to 0.09 | T4 | 18800 |
| Comparative Example 3 | CG1 | 3250 | 2 | 14 | 2 | 0.08 to 0.09 | T5 | 18800 |
| Comparative Example 4 | CG1 | 3250 | 2 | 14 | 2 | 0.08 to 0.09 | T6 | 18800 |
| Example 4 | CG1 | 3250 | 2 | 14 | 2 | 0.08 to 0.09 | T7 | 18800 |

TABLE 17-continued

| | | | | | | | | | |
|---|---|---|---|---|---|---|---|---|---|
| Example 5 | CG1 | 3250 | 2 | 14 | 2 | 0.08 to 0.09 | T8 | 18800 | |
| Comparative Example 5 | CG1 | 3250 | 2 | 14 | 2 | 0.08 to 0.09 | T9 | 18800 | |
| Example 6 | CG1 | 3250 | 2 | 14 | 2 | 0.08 to 0.09 | T10 | 18800 | |
| Example 7 | CG1 | 3250 | 2 | 14 | 2 | 0.08 to 0.09 | T11 | 18800 | |
| Comparative Example 6 | CG1 | 3250 | 2 | 14 | 2 | 0.08 to 0.09 | T12 | 18800 | |
| Comparative Example 7 | CG1 | 3250 | 2 | 14 | 2 | 0.08 to 0.09 | T13 | — | |
| Comparative Example 8 | CG1 | 3250 | 2 | 14 | 2 | 0.08 to 0.09 | T14 | — | |
| Example 8 | CG2 | 3250 | 2 | 16 | 0 | 0 | T1 | 18800 | |
| Example 9 | CG3 | 3250 | 2 | 15 | 0.5 | 0.02 | T1 | 18800 | |
| Example 10 | CG4 | 3250 | 2 | 0.5 | 4.4 | 0.41 to 0.54 | T1 | 18800 | |

| | Clear ink | | | | Evaluation items | | | |
|---|---|---|---|---|---|---|---|---|
| | Vinyl chloride-vinyl acetate copolymer | | Organic solvent | | | | | |
| | Amount (%) | Mt2/Mt1 | BP(° C.) | Amount (%) | Appearance | Peel strength | Ejection performance C | Ejection performance T |
| Example 1 | 4 | 0.98 | 172 | 95.9 | 5 | 10 | 10 | 10 |
| Comparative Example 1 | — | — | — | — | 5 | 3 | 10 | — |
| Comparative Example 2 | 0 | 0 | 172 | 85.9 | 5 | 2 | 10 | 10 |
| Example 2 | 4 | 0.50 | 172 | 92 | 5 | 8 | 10 | 8 |
| Example 3 | 3.2 | 0.40 | 172 | 92 | 5 | 6 | 10 | 10 |
| Comparative Example 3 | 2.6 | 0.30 | 172 | 91.4 | 5 | 4 | 10 | 10 |
| Comparative Example 4 | 1.9 | 0.20 | 172 | 90.3 | 5 | 2 | 10 | 10 |
| Example 4 | 1.6 | 0.50 | 172 | 96.8 | 5 | 7 | 10 | 10 |
| Example 5 | 1.4 | 0.40 | 172 | 96.5 | 5 | 5 | 10 | 10 |
| Comparative Example 5 | 1.1 | 0.30 | 172 | 96.3 | 5 | 3 | 10 | 10 |
| Example 6 | 1.6 | 0.50 | 172 | 96.8 | 5 | 8 | 10 | 10 |
| Example 7 | 1.4 | 0.40 | 172 | 96.5 | 5 | 6 | 10 | 10 |
| Comparative Example 6 | 1.1 | 0.30 | 172 | 96.3 | 5 | 3 | 10 | 10 |
| Comparative Example 7 | 0 | 0 | 172 | 95.9 | 5 | 1 | 10 | 10 |
| Comparative Example 8 | 0 | 0 | 172 | 95.9 | 5 | 1 | 10 | 10 |
| Example 8 | 4 | 0.98 | 172 | 95.9 | 5 | 7 | 10 | 10 |
| Example 9 | 4 | 0.98 | 172 | 95.9 | 5 | 9 | 10 | 10 |
| Example 10 | 4 | 0.98 | 172 | 95.9 | 5 | 8 | 7 | 10 |

TABLE 18

| | Color ink group | | | | | Clear ink | |
| | Color ink group No. | Polymerizable compound | | | Vinyl chloride-vinyl acetate copolymer | Clear ink No. | Vinyl chloride-vinyl acetate copolymer |
| | | Mw | Number of function-ality | Amount (%) | Amount (%) | Mc2/Mc1 | | Mw |
|---|---|---|---|---|---|---|---|---|
| Example 11 | CG1 | 3250 | 2 | 14 | 2 | 0.08 to 0.09 | T15 | 30000 |
| Example 12 | CG1 | 3250 | 2 | 14 | 2 | 0.08 to 0.09 | T16 | 19600 |
| Example 13 | CG1 | 3250 | 2 | 14 | 2 | 0.08 to 0.09 | T17 | 16000 |
| Example 14 | CG1 | 3250 | 2 | 14 | 2 | 0.08 to 0.09 | T18 | 13000 |
| Example 15 | CG1 | 3250 | 2 | 14 | 2 | 0.08 to 0.09 | T19 | 18800 |
| Example 16 | CG1 | 3250 | 2 | 14 | 2 | 0.08 to 0.09 | T20 | 18800 |
| Example 17 | CG1 | 3250 | 2 | 14 | 2 | 0.08 to 0.09 | T21 | 18800 |
| Example 18 | CG1 | 3250 | 2 | 14 | 2 | 0.08 to 0.09 | T22 | 18800 |
| Example 19 | CG5 | 1100 | 2 | 14 | 2 | 0.08 to 0.09 | T1 | 18800 |
| Example 20 | CG6 | 3000 | 2 | 14 | 2 | 0.08 to 0.09 | T1 | 18800 |
| Example 21 | CG7 | 18000 | 2 | 14 | 2 | 0.08 to 0.09 | T1 | 18800 |
| Example 22 | CG8 | 2400 | 3 | 14 | 2 | 0.08 to 0.09 | T1 | 18800 |
| Example 23 | CG9 | 215 | 1 | 14 | 2 | 0.08 to 0.09 | T1 | 18800 |
| Example 24 | CG4 | 3250 | 2 | 0.5 | 4.4 | 0.41 to 0.54 | T4 | 18800 |

| | Clear ink | | | | Evaluation items | | | |
| | Vinyl chloride-vinyl acetate copolymer | | Organic solvent | | | | Ejection perfor-mance C | Ejection perfor-mance T |
| | Amount (%) | Mt2/Mt1 | BP(° C.) | Amount (%) | Appear-ance | Peel strength | | |
|---|---|---|---|---|---|---|---|---|
| Example 11 | 4 | 0.98 | 172 | 95.9 | 5 | 10 | 10 | 7 |
| Example 12 | 4 | 0.98 | 172 | 95.9 | 5 | 10 | 10 | 9 |
| Example 13 | 4 | 0.98 | 172 | 95.9 | 5 | 9 | 10 | 10 |
| Example 14 | 4 | 0.98 | 172 | 95.9 | 5 | 7 | 10 | 10 |
| Example 15 | 3 | 0.97 | 172 | 96.9 | 5 | 7 | 10 | 10 |
| Example 16 | 5 | 0.98 | 172 | 94.9 | 5 | 10 | 10 | 6 |
| Example 17 | 4 | 0.98 | 125 | 95.9 | 5 | 10 | 10 | 7 |
| Example 18 | 4 | 0.98 | 278 | 95.9 | 5 | 8 | 10 | 10 |

TABLE 18-continued

| | | | | | | | | |
|---|---|---|---|---|---|---|---|---|
| Example 19 | 4 | 0.98 | 172 | 95.9 | 5 | 9 | 10 | 10 |
| Example 20 | 4 | 0.98 | 172 | 95.9 | 5 | 10 | 10 | 10 |
| Example 21 | 4 | 0.98 | 172 | 95.9 | 5 | 10 | 7 | 10 |
| Example 22 | 4 | 0.98 | 172 | 95.9 | 5 | 7 | 10 | 10 |
| Example 23 | 4 | 0.98 | 172 | 95.9 | 5 | 5 | 10 | 10 |
| Example 24 | 3.2 | 0.40 | 172 | 92.0 | 5 | 5 | 7 | 10 |

As shown in Tables 17 and 18, in Examples 1 to 24 in which ink sets each including a color ink containing a polymerizable compound and a clear ink containing a vinyl chloride-vinyl acetate copolymer and having a Mt2/Mt1 of 0.40 or more were used, the thermal fusion product having a layered structure of lamination substrate/clear ink layer/color image/recording medium exhibited good peel strength between the recording medium and the lamination substrate.

In contrast to these Examples, in Comparative Examples 2, 7, and 8 in which the clear inks contained no vinyl chloride-vinyl acetate copolymers, and Comparative Examples 3 to 6 in which the clear inks contained vinyl chloride-vinyl acetate copolymers but had a Mt2/Mt1 of less than 0.40, the peel strength between the recording medium and the lamination substrate was poor in the case of producing a thermal fusion product having a layered structure of lamination substrate/clear ink layer/color image/recording medium.

In contrast to the Examples, in Comparative Example 1 in which no clear ink was used, the thermal fusion product having a layered structure of lamination substrate/color image/recording medium exhibited poor peel strength between the recording medium and the lamination substrate.

The results of Examples 1 and 19 to 23 show that when the polymerizable compound contained in the color ink includes a bifunctional urethane (meth)acrylate having a Mw of 2,000 to 15,000 (Examples 1, 20, and 22), the peel strength and the ejection performance of the color ink (ejection performance C) are particularly good.

The results of Examples 1 and 8 to 10 show that when the color ink further contains a vinyl chloride-vinyl acetate copolymer (Examples 1, 9, and 10), the peel strength further improves.

The results of Examples 1, 9, and 10 show that when the content of the vinyl chloride-vinyl acetate copolymer contained in the color ink is 0.5% by mass to 2.0% by mass relative to the total amount of the color ink (Examples 1 and 9), the peel strength and the ejection performance of the color ink (ejection performance C) are particularly good.

The results of Examples 10 and 24 show that when $Mc2/Mc1 \leq Mt2/Mt1$ is satisfied (Example 10), the peel strength is superior.

The entire disclosure of JP2017-213192 filed in the Japan Patent Office on Nov. 2, 2017 is incorporated herein by reference.

All documents, patent applications, and technical standards mentioned in the present specification are incorporated herein by reference to the same extent as in the case where it is specifically and individually stated that the individual documents, patent applications, and technical standards are incorporated by reference.

What is claimed is:

1. An ink set comprising:
   an ink-jet color ink that contains a colorant, an organic solvent, a polymerizable compound, and a photopolymerization initiator; and
   a clear ink that contains an organic solvent and a vinyl chloride-vinyl acetate copolymer, and in which Mt2/Mt1 is 0.40 or more, wherein Mt1 represents a total mass content of a nonvolatile component in the clear ink, and Mt2 represents a mass content of the vinyl chloride-vinyl acetate copolymer in the clear ink.

2. The ink set according to claim 1, wherein a content of the vinyl chloride-vinyl acetate copolymer contained in the clear ink is from 1.0% by mass to 6.0% by mass relative to a total amount of the clear ink.

3. The ink set according to claim 1, wherein a content of the organic solvent contained in the clear ink is 90% by mass or more relative to a total amount of the clear ink.

4. The ink set according to claim 2, wherein a content of the organic solvent contained in the clear ink is 90% by mass or more relative to a total amount of the clear ink.

5. The ink set according to claim 1, wherein the polymerizable compound contained in the ink-jet color ink includes a bifunctional urethane (meth)acrylate having a weight-average molecular weight of from 2,000 to 15,000.

6. The ink set according to claim 4, wherein the polymerizable compound contained in the ink-jet color ink includes a bifunctional urethane (meth)acrylate having a weight-average molecular weight of from 2,000 to 15,000.

7. The ink set according to claim 1, wherein the ink-jet color ink further contains a vinyl chloride-vinyl acetate copolymer.

8. The ink set according to claim 6, wherein the ink-jet color ink further contains a vinyl chloride-vinyl acetate copolymer.

9. The ink set according to claim 7, wherein a total content of the polymerizable compound and the vinyl chloride-vinyl acetate copolymer that are contained in the ink-jet color ink is from 10% by mass to 20% by mass relative to a total amount of the ink-jet color ink.

10. The ink set according to claim 9, wherein a content of the vinyl chloride-vinyl acetate copolymer contained in the ink-jet color ink is from 0.5% by mass to 2.0% by mass relative to a total amount of the ink-jet color ink.

11. The ink set according to claim 7, wherein Mt1, Mt2, Mc1, and Mc2 satisfy the following formula (1):

$$Mc2/Mc1 \leq Mt2/Mt1 \qquad \text{Formula (1)}$$

wherein Mt1 represents the total mass content of the nonvolatile component contained in the clear ink,
Mt2 represents the mass content of the vinyl chloride-vinyl acetate copolymer contained in the clear ink,
Mc1 represents a total mass content of a nonvolatile component contained in the ink-jet color ink, and Mc2 represents a mass content of the vinyl chloride-vinyl acetate copolymer contained in the ink-jet color ink.

12. The ink set according to claim 11, wherein a total content of the polymerizable compound and the vinyl chloride-vinyl acetate copolymer that are contained in the ink-jet color ink is from 10% by mass to 20% by mass relative to a total amount of the ink-jet color ink.

13. The ink set according to claim 11, wherein a content of the vinyl chloride-vinyl acetate copolymer contained in the ink-jet color ink is from 0.5% by mass to 2.0% by mass relative to a total amount of the ink-jet color ink.

14. The ink set according to claim 1, wherein a content of a polymerizable compound in the clear ink is 3% by mass or less relative to a total amount of the clear ink.

15. The ink set according to claim 6, wherein a content of a polymerizable compound in the clear ink is 3% by mass or less relative to a total amount of the clear ink.

16. The ink set according to claim 12, wherein a content of a polymerizable compound in the clear ink is 3% by mass or less relative to a total amount of the clear ink.

17. The ink set according to claim 13, wherein a content of a polymerizable compound in the clear ink is 3% by mass or less relative to a total amount of the clear ink.

\* \* \* \* \*